United States Patent
Aubel et al.

(10) Patent No.: US 8,839,177 B1
(45) Date of Patent: Sep. 16, 2014

(54) METHOD AND SYSTEM ALLOWING FOR SEMICONDUCTOR DESIGN RULE OPTIMIZATION

(71) Applicant: International Business Machines Corporation, Armonk, NY (US)

(72) Inventors: Mark D. Aubel, Essex Junction, VT (US); Jeanne P. Bickford, Essex Junction, VT (US); Howard S. Landis, Underhill, VT (US); Michael T. Ross, Milton, VT (US); Mark S. Styduhar, Hinesburg, VT (US); Charles H. Windisch, Jr., Essex Juction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/972,965

(22) Filed: Aug. 22, 2013

(51) Int. Cl.
*G06F 17/50* (2006.01)
(52) U.S. Cl.
CPC .................... *G06F 17/505* (2013.01)
USPC ........................................................ 716/132
(58) Field of Classification Search
USPC ................................................. 716/100, 132
See application file for complete search history.

(56) References Cited

U.S. PATENT DOCUMENTS

| | | | |
|---|---|---|---|
| 5,877,091 A | 3/1999 | Kawakami | |
| 6,147,394 A * | 11/2000 | Bruce et al. | 257/506 |
| 6,605,545 B2 * | 8/2003 | Wang | 438/717 |
| 6,609,235 B2 | 8/2003 | Ramaswamy et al. | |
| 7,139,990 B2 * | 11/2006 | Singh et al. | 716/112 |
| 7,257,783 B2 | 8/2007 | Allen et al. | |
| 7,627,837 B2 * | 12/2009 | Zhang | 716/53 |
| 7,840,923 B2 | 11/2010 | Mccoo et al. | |
| 7,898,065 B2 * | 3/2011 | Anderson et al. | 257/629 |
| 8,281,264 B2 * | 10/2012 | Zhang | 716/51 |
| 8,423,945 B2 | 4/2013 | Bickford et al. | |
| 2005/0216873 A1 * | 9/2005 | Singh et al. | 716/5 |
| 2005/0226068 A1 * | 10/2005 | Brandon et al. | 365/203 |
| 2006/0085772 A1 * | 4/2006 | Zhang | 716/4 |
| 2006/0118960 A1 * | 6/2006 | Landis | 257/758 |
| 2007/0050736 A1 | 3/2007 | Bickford et al. | |
| 2007/0168895 A1 | 7/2007 | Ikeuchi | |
| 2008/0022245 A1 | 1/2008 | Tsai | |

(Continued)

OTHER PUBLICATIONS

Bhave, S., "Semiconductor Fabrication and Layout Design Rules," CU School of Electrical and Computer Engineering, Feb. 3, 2010, 23 pages.

(Continued)

*Primary Examiner* — Suchin Parihar
(74) *Attorney, Agent, or Firm* — Gibb & Riley, LLC

(57) ABSTRACT

Disclosed are integrated circuit design systems and methods, wherein selected functional library elements are placed in a layout to meet product specifications and selected hybrid fill-placeable library elements are placed in that same layout to meet at least one feature density rule. Each hybrid fill-placeable library element comprises fill shapes corresponding to specific features subject to a density rule and a marker shape that provides an instruction to ignore any density rule violations within that element for purposes of design rule checking. Placement of the hybrid fill-placeable library elements is performed to balance out density rule violations in functional library elements elsewhere in the layout, thereby avoiding the need for post-processing of the completed IC design to add fill shapes. Optionally, each hybrid fill-placeable library element comprises different fill shapes at different levels and corresponding to different features so that it can be employed to meet multiple different density rules.

20 Claims, 15 Drawing Sheets

(56) References Cited

U.S. PATENT DOCUMENTS

| | | |
|---|---|---|
| 2008/0203540 A1* | 8/2008 | Anderson et al. ............. 257/629 |
| 2008/0286888 A1* | 11/2008 | Hsu et al. ........................ 438/18 |
| 2009/0032956 A1* | 2/2009 | Landis ........................... 257/758 |
| 2009/0096066 A1* | 4/2009 | Anderson et al. ............. 257/629 |
| 2009/0121353 A1* | 5/2009 | Ramappa et al. ............. 257/751 |
| 2009/0243119 A1 | 10/2009 | Terayama |
| 2010/0090320 A1* | 4/2010 | Anderson et al. ............. 257/629 |
| 2010/0153904 A1* | 6/2010 | Zhang ............................. 716/21 |
| 2011/0057320 A1 | 3/2011 | Fujiyama |
| 2011/0156148 A1 | 6/2011 | Yu |
| 2012/0261824 A1 | 10/2012 | Koti |

OTHER PUBLICATIONS

Abercrombie, et al., "Restrictive Design Rules and Their Impact on 22 nm Design and Physical Verification," IEEE, 2009, 15 pages.

Pal, et al., "Model for Metal Interconnection Design Rule Optimization," Microelectronic Engineering, 56, 2001, pp. 295-302.

Saeki, T., "Design Rule Relaxation Approach for High-Density DRAMs," IEICE Transaction on Electronics, vol. E77-C, Issue 3, Mar. 1994, ABS Only.

Disclosed Anonymously, "Method and System to Optimize Pattern Density for Yield Improvement," ip.com Prior Art Database, IPCOM000195058D, Apr. 20, 2010, 3 pages.

* cited by examiner

METHOD AND SYSTEM ALLOWING FOR SEMICONDUCTOR DESIGN RULE OPTIMIZATION

BACKGROUND

Generally, the goals of integrated circuit design are to optimize integrated circuit density, timing and various other parameters (e.g., electrical parameters) in order to develop products that meet desired performance specifications at a relatively low-cost and within a relatively fast turn-around time. There are various design options that can be used to meet these goals. For example, an application-specific integrated circuit (ASIC) refers to an integrated circuit that is at least partially custom-designed to perform a particular function. Various different types of ASIC design techniques are well known in the art and include, but are not limited to, standard cell ASIC design, mask-programmable gate array ASIC design, field-programmable gate array ASIC design, structured ASIC design, full custom ASIC design, or combinations thereof (e.g., embedded array ASIC design, which combines standard cell and gate array ASIC design).

In any case, integrated circuit design typically begins with a high-level description of the integrated circuit. This high-level description sets out the requirements for the integrated circuit chip and is stored on a data storage device in, for example, a hardware description language (HDL), such as VHDL or Verilog. Next, a logic synthesis tool can synthesize the high-level description into low-level constructs. For example, in the case of ASIC design the high-level description can be synthesized using library elements (e.g., standard cells in standard cell ASIC design or gate array base cells in gate array ASIC design). That is, the logic synthesis tool can synthesize a gate-level netlist from the high-level description. After logic synthesis, a placement tool can establish placement (i.e., location on the integrated circuit chip) of the library elements. Then, a routing tool can perform routing (e.g., can define the wires that will interconnect the library elements) and a timing analysis tool can perform timing analysis. Logic synthesis, placement, routing, and timing can be iteratively repeated, as necessary, to complete the design.

Following completion of the design, a design rule checking tool can determine if all design rules for a given technology have been met. Such design rules can include, for example, minimum and maximum density requirements for specific features at different mask levels (e.g., diffusion regions within the semiconductor substrate, deep trenches for deep trench isolation and/or deep trench capacitors within the substrate, polysilicon features on the semiconductor substrate, local interconnect features for connecting diffusion, polysilicon and/or deep trench features, metal features in the metal levels, via interconnect features for connecting metal levels etc.). These density requirements are typically set to minimize variation in the completed mask image on the product after lithographic, planarization, or etch processing. If a minimum density requirement is not met by the completed design, additional shapes can be added in open spaces within the design. For example, if the minimum density requirement for some specific features (e.g., deep trenches, polysilicon features, local interconnect features, metal features, via features, etc.) is not met, fill shapes (also referred to in the art as non-functional shapes, electrically inactive shapes, dummy shapes, etc.) corresponding to that feature can be placed at the appropriate mask level within open spaces in the integrated circuit chip regions on the semiconductor wafer and/or within open spaces between the integrated circuit chip regions (i.e., within kerf regions) in order to meet that minimum density requirement.

Following the addition of any fill shapes, a mask layout generation tool can generate a mask layout based on data and information accumulated during the previous processing. This mask layout can define, in hierarchical form, the detailed geometric shapes, text labels, and other information required for each mask level to be used in the actual fabrication of the integrated circuit under design. This mask layout can be stored, for example, in an industry standard database file format, such as Graphic Data System II (GDSII) or Oasis. The mask layout can subsequently proceed to tape-out (e.g., can be released to manufacturing, can be released to a mask house, can be sent to another design house, can be sent back to a customer, etc.).

Unfortunately, as a result of adding shapes to the open spaces in a completed design in order to meet design rules, the surface areas of the integrated circuit chip regions and/or the kerf regions in between are often increased to accommodate the added fill shapes, thereby reducing the number of integrated circuit chips per semiconductor wafer and increasing manufacturing costs.

SUMMARY

In view of the foregoing disclosed herein are integrated circuit (IC) design systems and methods that use a combination of both functional library elements and hybrid fill-placeable library elements. Specifically, during the design process, selected functional library elements can be placed in a layout of an integrated circuit chip in order to meet product specifications and selected hybrid fill-placeable library elements can also be placed at various locations in that same layout, as defined using a placement algorithm, in order to meet at least one feature density rule (e.g., a minimum or maximum density rule directed to specific features, such as deep trench features, diffusion regions, polysilicon features, local interconnect features, via interconnect features or other metal features, at a specific mask level). Each hybrid fill-placeable library element can comprise fill shapes corresponding to specific features subject to a density rule and a corresponding marker shape that provides an instruction to ignore any density rule violations within that element for purposes of design rule checking. Placement of the hybrid fill-placeable library elements can be used to balance out density rule violations in functional library elements also in the layout. Optionally, each hybrid fill-placeable library element can comprise different fill shapes at different levels and corresponding to different features so that the same hybrid fill-placeable library element can be employed to meet multiple different density rules.

More particularly, disclosed herein is a computer-aided design system that incorporates the use of functional library elements and hybrid fill-placeable library elements in order to generate an integrated circuit (IC) design (e.g., an application-specific integrated circuit (ASIC) design) that meets both product specifications and feature density rules, thereby minimizing the need for post-processing of the completed IC design to add fill shapes. This design system can comprise a memory (e.g., a computer-readable storage medium) and at least one processor able to access the memory.

The memory can store a library (e.g., an ASIC library). The library can comprise pre-qualified library elements including both functional library elements and hybrid fill-placeable library elements.

The processor can access the library and aide in the design of an integrated circuit chip. Specifically, the processor can place, in the layout of an integrated circuit chip under design, both selected functional library elements to meet product specifications and at least one selected hybrid fill-placeable library element to meet, at either the tile-level or product-level, a first density rule directed to first features. The selected hybrid fill-placeable library element can comprise, at a first mask layer, first fill shapes that are electrically non-functional and that correspond to the first features at issue in the first density rule. Placement of such selected hybrid fill-placeable library element(s) within the layout of the integrated circuit chip can be made at one or more locations (e.g., as defined by a placement algorithm) in order to balance out any violation of the first density rule by one or more of the selected functional library element(s) and, thereby to ensure that the first density rule is met at the tile-level or product-level, as applicable. Thus, such selected hybrid fill-placeable library element(s) can be placed in the layout so that the completed IC design will pre-emptively meet the first density rule at the tile-level or product-level, thereby eliminating the need for post-processing of the completed IC design to add fill shapes.

It should be noted that each selected hybrid fill-placeable library element can further comprise a corresponding marker shape. This corresponding marker shape can provide an instruction, which defines one or more custom design rules and, particularly, custom feature density rules. This instruction can be executed (e.g., by the processor) during design rule checking and, particularly, design rule compliance verification to override any global feature density rule violations exhibited by that selected hybrid fill-placeable library element.

Optionally, each selected hybrid fill-placeable library element can comprise, at different mask layers, different fill shapes corresponding to different features so that the same hybrid fill-placeable library element can be employed to meet multiple different feature density rules.

Also disclosed herein is a computer-aided design method that incorporates the use of a combination of both functional library elements and hybrid fill-placeable library elements in order to generate an integrated circuit (IC) design (e.g., an application-specific integrated circuit (ASIC) design) that meets both product specifications and feature density rules, thereby minimizing the need for post-processing of the completed IC design to add fill shapes.

This design method can comprise accessing (e.g., by a processor of a computer-aided design system) a library (e.g., an ASIC library) that is stored in a memory (e.g., on a computer-readable storage medium). This library can comprise pre-qualified library elements including both functional library elements and hybrid fill-placeable library elements.

The design method can further comprise designing (e.g., by a processor of a computer-aided design system) an integrated circuit chip. Specifically, the design method can comprise placing (e.g., by the processor of the computer-aided design system), in a layout of an integrated circuit chip under design, both selected functional library elements to meet product specifications and at least one selected hybrid fill-placeable library element to meet, at either the tile-level or product-level, a first density rule directed to first features. The selected hybrid fill-placeable library element can comprise, at a first mask layer, first fill shapes that are electrically non-functional and that correspond to the first features at issue in the first density rule. Placement of such selected hybrid fill-placeable library element(s) within the layout of the integrated circuit chip can be made at one or more locations (e.g., as defined by a placement algorithm) in order to balance out any violations of the first density rule by one or more of the selected functional library element(s) and, thereby to ensure that the first density rule is met at the tile-level or product-level, as applicable. Thus, such selected hybrid fill-placeable library element(s) can be placed in the layout so that the completed IC design will pre-emptively meet the first density rule at the tile-level or product-level, thereby eliminating the need for post-proces sing of the completed IC design to add fill shapes.

It should be noted that each selected hybrid fill-placeable library element can further comprise a corresponding marker shape. This corresponding marker shape can provide an instruction, which defines one or more custom design rules and, particularly, custom feature density rules. This instruction can be executed (e.g., by a processor of the computer-aided design system) during design rule checking and, particularly, during design rule compliance verification to override any global feature density rule violations exhibited by that selected hybrid fill-placeable library element.

Optionally, each selected hybrid fill-placeable library element can comprise, at different mask layers, different fill shapes corresponding to different features so that the same hybrid fill-placeable library element can be employed to meet multiple different feature density rules.

Also, disclosed herein is a hybrid fill-placeable library element. The hybrid fill-placeable library element can be pre-qualified and stored, along with functional library elements and other hybrid fill-placeable library elements, in an application specific integrated circuit (ASIC) library on a computer-readable storage medium. The library and, particularly, the hybrid fill-placeable library element in that library can be accessible by a computer (e.g., by a processor of a computer-aided design system) during application ASIC design. The hybrid fill-placeable library element can be selectable (e.g., by a processor of the computer-aided design system) for placement in a layout of an integrated circuit chip under design in order to meet, at either a tile-level or a product-level, a first density rule directed to first features. Specifically, the hybrid fill-placeable library element can comprise first fill shapes that are electrically non-functional and that correspond to the first features. This hybrid fill-placeable library element can be selectable (e.g., by the computer) for placement at one or more specific locations (e.g., as defined by a placement algorithm) within the layout of the integrated circuit chip under design when any functional library element(s) placed in the layout violate that first density rule, thereby balancing out any violations of the first density rule and ensuring that the first density rule is met at the tile-level or product-level, as applicable.

It should be noted that this hybrid fill-placeable library element can also comprise a corresponding marker shape. This corresponding marker shape can provide an instruction, which defines one or more custom design rules and, particularly, custom feature density rules. This instruction can be executed (e.g., by a processor of the computer-aided design system) during any design rule checking and, particularly, during a design rule compliance verification process to override any global feature density rule violations exhibited by that hybrid fill-placeable library element.

Optionally, the hybrid fill-placeable library element can comprise, at different mask layers, different fill shapes corresponding to different features so that the same hybrid fill-placeable library element can be employed to meet multiple different feature density rules.

BRIEF DESCRIPTION OF THE DRAWINGS

The embodiments herein will be better understood from the following detailed description with reference to the drawings, which are not necessarily drawn to scale and in which.

DETAILED DESCRIPTION

Figure 1:
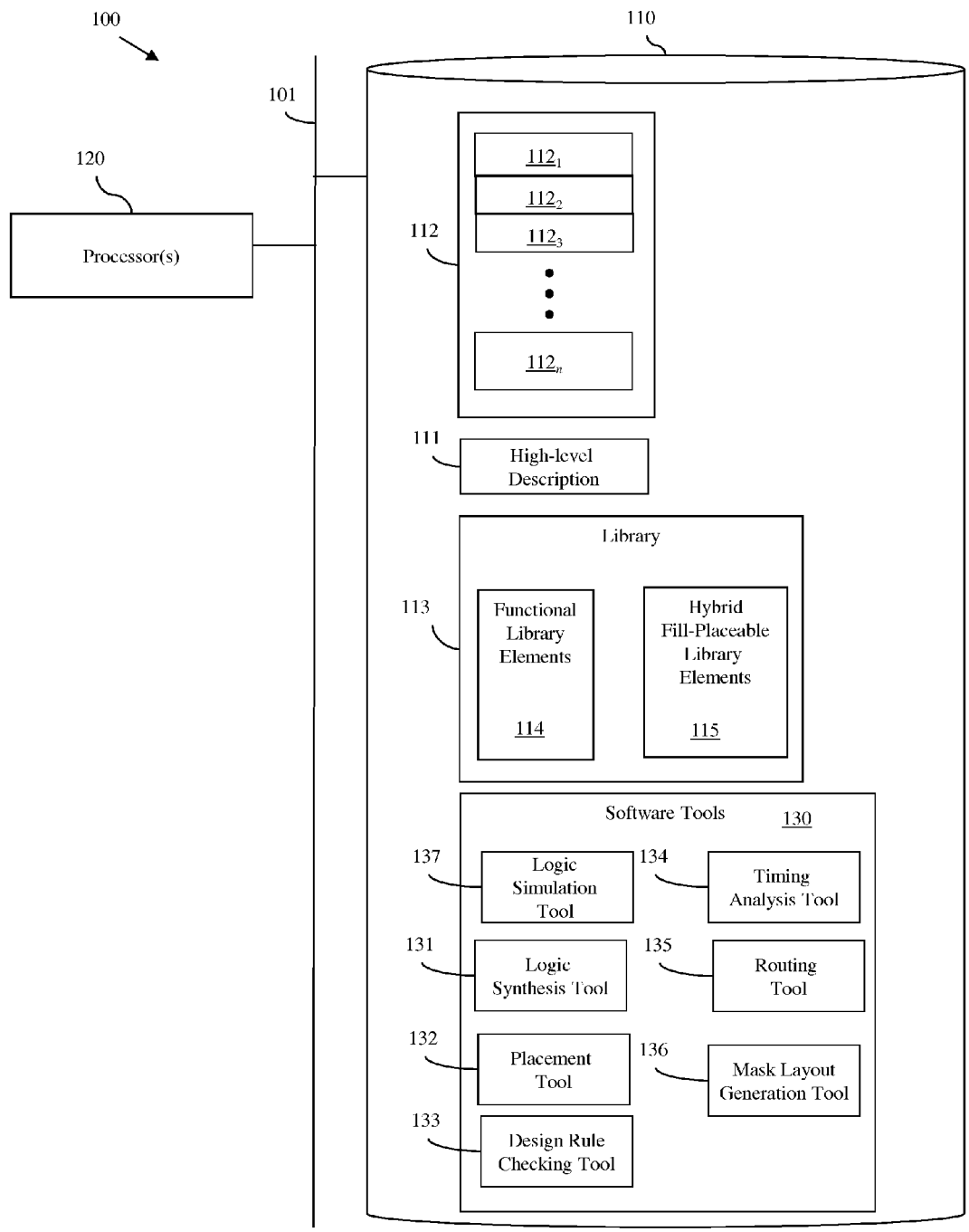
FIG. 1 is a schematic diagram illustrating a computer-aided integrated circuit (IC) design system.

As mentioned above, generally, the goals of integrated circuit design are to optimize integrated circuit density, timing and various other parameters (e.g., electrical parameters) in order to develop products that meet desired performance specifications at a relatively low-cost and within a relatively fast turn around time. There are various design options that can be used to meet these goals. For example, an application-specific integrated circuit (ASIC) refers to an integrated circuit that is at least partially custom-designed to perform a particular function. Various different types of ASIC design techniques are well known in the art and include, but are not limited to, standard cell ASIC design, mask-programmable gate array ASIC design, field-programmable gate array ASIC design, structured ASIC design, full custom ASIC design, or combinations thereof (e.g., embedded array ASIC design, which combines standard cell and gate array ASIC design).

In any case, integrated circuit design typically begins with a high-level description of the integrated circuit. This high-level description sets out the requirements for the integrated circuit chip and is stored on a data storage device in, for example, a hardware description language (HDL), such as VHDL or Verilog. Next, a logic synthesis tool can synthesize the high-level description into low-level constructs. For example, in the case of ASIC design the high-level description can be synthesized using library elements (e.g., standard cells in standard cell ASIC design or gate array base cells in gate array ASIC design). That is, the logic synthesis tool can synthesize a gate-level netlist from the high-level description. After logic synthesis, a placement tool can establish placement (i.e., location on the integrated circuit chip) of the library elements. Then, a routing tool can perform routing (e.g., can define the wires that will interconnect the library elements) and a timing analysis tool can perform timing analysis. Logic synthesis, placement, routing, and timing can be iteratively repeated, as necessary, to complete the design.

Following completion of the design, a design rule checking tool can determine if all design rules for a given technology have been met. Such design rules can include, for example, minimum and maximum density requirements for specific features at different mask levels (e.g., diffusion regions within the semiconductor substrate, deep trenches for deep trench isolation and/or deep trench capacitors within the substrate, polysilicon features on the semiconductor substrate, local interconnect features for connecting diffusion, polysilicon and/or deep trench features, metal features in the metal levels, via features, via interconnect features for connecting metal levels, etc.). These density requirements are typically set to minimize variation in the completed mask image on the product after lithographic, planarization, or etch processing. If a minimum density requirement is not met by the completed design, additional shapes can be added in open spaces within the design. For example, if the minimum density requirement for some specific features (e.g., deep trenches, polysilicon features, local interconnect features, metal features, via features, etc.) is not met, fill shapes (also referred to in the art as non-functional shapes, electrically inactive shapes, dummy shapes, etc.) corresponding to that feature can be placed at the appropriate mask level within open spaces in the integrated circuit chip regions on the semiconductor wafer and/or within open spaces between the integrated circuit chip regions (i.e., within kerf regions) in order to meet that minimum density requirement.

Following the addition of any fill shapes, a mask layout generation tool can generate a mask layout based on data and information accumulated during the previous processing. This mask layout can define, in hierarchical form, the detailed geometric shapes, text labels, and other information required for each mask level to be used in the actual fabrication of the integrated circuit under design. This mask layout can be stored, for example, in an industry standard database file format, such as Graphic Data System II (GDSII) or Oasis. The mask layout can subsequently proceed to tape-out (e.g., can be released to manufacturing, can be released to a mask house, can be sent to another design house, can be sent back to a customer, etc.).

Unfortunately, as a result of adding shapes to the open spaces in a completed design in order to meet design rules, the surface areas of the integrated circuit chip regions and/or the kerf regions in between are often increased to accommodate the added fill shapes, thereby reducing the number of integrated circuit chips per semiconductor wafer and increasing manufacturing costs.

In view of the foregoing disclosed herein are integrated circuit (IC) design systems and methods that use a combination of both functional library elements and hybrid fill-placeable library elements. Specifically, during the IC design process, selected functional library elements can be placed in a layout of an integrated circuit chip in order to meet product specifications and selected hybrid fill-placeable library elements can also be placed at various locations in that same layout, as defined using a placement algorithm, in order to meet at least one feature density rule (e.g., a minimum or maximum density rule directed to specific features, such as deep trench features, diffusion regions, polysilicon features, local interconnect features, via interconnect features, or other metal features, at a specific mask level). Each hybrid fill-placeable library element can comprise fill shapes corresponding to specific features subject to a density rule and a corresponding marker shape that provides an instruction to ignore any density rule violations within that element for purposes of design rule checking. Placement of the hybrid fill-placeable library elements can be used to balance out density rule violations in functional library elements also in the layout. Optionally, each hybrid fill-placeable library element can comprise different fill shapes at different levels and corresponding to different features so that the same hybrid fill-placeable library element can be employed to meet multiple different density rules.

More particularly, FIG. 1 is a schematic diagram illustrating a computer-aided integrated circuit (IC) design system 100 (e.g., an application-specific integrated circuit (ASIC) computer-aided design system) that incorporates the use of a combination of both functional library elements and hybrid fill-placeable library elements in order to generate an IC design that meets both product specifications and feature density rules, thereby minimizing the need for post-processing of the completed IC design to add fill shapes. This system 100 can be implemented, for example, in a computer hardware environment such as that described in detail below and depicted in FIG. 15. Alternatively, the system 100 could be implemented on any other computerized device or network of devices having the required data storage and processing capability to perform the described processes (e.g., a distributed computer system of multiple autonomous computers that communicate through a computer network, a laptop computer, a tablet computer, etc.).

In any case, this system 100 can comprise one or more memory devices 110 (e.g., data storage devices) and one or more processors 120 in communication with the memory device(s) 110 (e.g., over a system bus 101 or over any wired or wireless communication network).

The memory device(s) 110 can store information including, but not limited to, data and instructions required for design of an integrated circuit chip.

Specifically, the memory device(s) 110 can store a high-level description 111 of an integrated circuit chip under design in a given technology. The high-level description 111 can describe the product specifications.

The memory device(s) 110 can further store design rules and, particularly, feature density rules 112 associated with the given technology within which the integrated circuit chip is being designed. These feature density rules 112 can comprise, for example, minimum and/or maximum density requirements for different features, which will be defined during manufacturing using different mask layers. For example, the feature density rules 112 can comprise minimum and/or maximum density requirements $112_1$ for deep trench features within the semiconductor substrate (e.g., deep trenches for isolation structures within the semiconductor substrate, deep trenches for deep trench capacitor structures within the semiconductor substrate, etc.). The feature density rules 112 can also comprise minimum and/or maximum density requirements for diffusion regions $112_2$ within the semiconductor substrate. The feature density rules 112 can also comprise minimum and/or maximum density requirements for polysilicon features $112_3$ on the semiconductor substrate (e.g., for polysilicon gate structures on the semiconductor substrate, polysilicon resistor structures on the semiconductor substrate, etc.). The feature density rules 112 can also comprise minimum and/or maximum density requirements for metal features $112_n$ within the metal levels above the semiconductor substrate (e.g., metal vias, metal wires, etc.).

The memory device(s) 110 can store a library 113 (e.g., an ASIC library) and this library 113 can comprise pre-qualified library elements including both functional library elements 114 and hybrid fill-placeable library elements 115. The functional library elements 114 can comprise multi-layered data structures, wherein the layers of the data structures generally represent (i.e., define) different mask layers required for manufacture of different features on the integrated circuit chip.

Those skilled in the art will recognize that such functional library elements 114 will vary depending upon the type of IC design being employed. For example, for standard cell ASIC design the functional library elements 114 can comprise standard cells. For gate array ASIC design the functional library elements 114 can comprise gate array base cells. For embedded array ASIC design, the functional library elements 114 can comprise both standard cells and gate array base cells.

The hybrid fill-placeable library elements 115 can have the same form factor as the functional library elements 114. That is, the hybrid fill-placeable library elements 115 can also comprise multi-layered data structures. Although they have the same form factor as the functional library elements 114 and are multi-layered data structures, the hybrid fill-placeable library elements 115 represent electrically non-functional elements.

Figure 2:
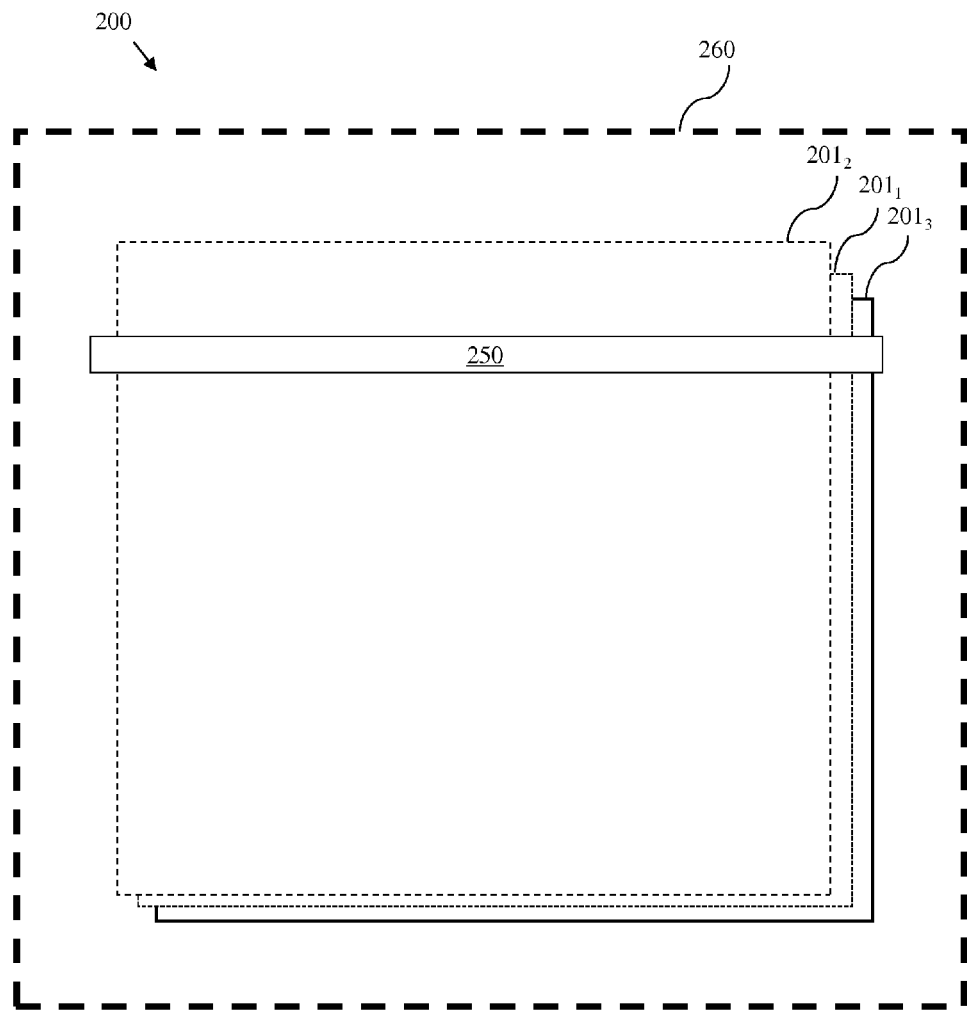
FIG. 2 is a diagram illustrating a hybrid fill-placeable library element.

As illustrated in FIG. 2, generally, each hybrid fill-placeable library element 200 can specifically comprise multiple layers $201_{1-3}$. These layers $201_{1-3}$ can generally represent (i.e., define) different mask layers required for manufacture of different fill shapes corresponding to the different features in the different mask layers of the functional library elements 114. For example, the layer $201_1$ can represent a first mask layer for first fill shapes corresponding to first features, layer $201_2$ can represent a second mask layer for second feature, layer $201_3$ can represent a third mask layer for third features, and so on. As mentioned above, the hybrid fill-placeable library elements are electrically non-functional and, thus, the fill shapes are electrically non-functional. For illustration purposes, three distinct mask layers are shown in the hybrid fill-placeable library element 200. However, those skilled in the art will recognize that the number of different mask layers would typically be between 10 and 80 with approximately half of those different mask layers corresponding to layers for device features (e.g., deep trench features, diffusion regions, polysilicon features, local interconnect features, via interconnect features, other metal features, etc.) within and/or on a semiconductor substrate and approximately half corresponding to layers for metal features (e.g., vias, wires, etc.) in the metal levels above the semiconductor substrate. Additionally, although, as mentioned above, the hybrid fill-placeable library elements and fill shapes contained therein are electrically non-functional, each hybrid fill-placeable library element 200 can comprise product-level power and ground through lines 250 allowing for integration of other library elements within the layout. That is, because of the product-level power and ground through-lines 250 (i.e., power and ground wires that pass through each hybrid fill-placeable library element 200, functional library elements 114 physically separated by one or more of the hybrid fill-placeable library elements can be electrically connected to each other. Each hybrid fill-placeable library element 200 can further comprise a corresponding marker shape 260. This corresponding marker shape 260 can provide an element-specific instruction, which defines one or more custom design rules and, particularly, custom feature density rules to be applied to that element (see detailed discussion below).

The memory device(s) 110 can further store a variety of software tools 130 comprising programs of instructions executable by the processor(s) 120 for performing various different functions. These software tools 130 can include, but are not limited to, a logic simulation tool 137, a logic synthesis tool 131, a library element placement tool 132, a routing tool 135, a timing analysis tool 134, a design rule checking tool 133, and a mask layout generation tool 136.

The processor(s) 120 can access the memory device(s) 110 and, particularly, the information stored therein including, the high-level description 111 of the integrated circuit chip, the design rules 112, the library 113 and software tools 130 and, using this information, can aide in the design of an integrated circuit chip. It should be understood a single processor can execute all of the software tools 130. Alternatively, any number of two or more different processors can execute the software tools 130. In any case in doing so, the processor(s) 120 can select and place functional library elements 114 in the layout of the integrated circuit chip under design in order to meet product specifications as set forth in the high-level description language 111. The processor(s) 120 can also select and place hybrid fill-placeable library elements 115 at various locations within that layout in order to meet one or more the feature density rules 112 at either the product-level or tile-level. For purposes of this disclosure, meeting a feature density rule at the "product-level" means that the feature density specified in the rule is met for the full layout of the integrated circuit chip. Alternatively, the full layout of the integrated circuit chip can be divided into a grid pattern of essentially identical rectangular or square-shaped sections or tiles, referred to herein as "tiles", where each tile can comprise multiple library elements. Meeting a feature density at the tile-level means that the feature density specified in the rule is met for one of these tiles.

More specifically, the processor(s) 120 execute the logic simulation tool 137 in order to perform logic simulation on the high-level description 111 of the integrated circuit chip under design in order to verify the description logic. The processor(s) 120 can further execute the synthesis tool 131 in order to synthesize the high-level description 111 of the integrated circuit chip under design into an optimized lower-level description (e.g., a gate level netlist) that meets the product design specifications.

For example, in the case of standard cell ASIC design, the logic synthesis tool 131 can select low-level components and, particularly, the functional library elements 114 (which in this case would be standard cells) from the ASIC library 113 in order to generate a gate-level netlist for a product that meets the product specifications. Alternatively, in the case of gate array ASIC design, the logic synthesis tool 131 can select low-level components and, particularly, functional library elements 114 (which in this case would be gate array base cells) for a gate array from the ASIC library 113 in order to generate a gate-level netlist for a product that meets the product specifications.

The processor(s) 120 can further execute the placement tool 132 in order to convert the low-level description of the integrated circuit chip (i.e., the gate-level netlist) into an initial layout for the integrated circuit chip. Specifically, the processor(s) 120 can execute the placement tool 132 in order to place, in a layout of the integrated circuit chip under design, the functional library elements 114 as set forth in the low-level description. In addition, the processor(s) 120 can execute the placement tool 132 in order to select one or more hybrid fill-placeable library elements 115 from the library 113 and place the selected hybrid fill element(s) into the layout at one or more different locations (e.g., as defined by placement algorithms) in order to meet, at either the tile-level or product-level, one or more of the feature density rules 112.

For example, a first density rule $112_1$ can specify a first density requirement (e.g., either a minimum density requirement or a maximum density requirement) for first features on the integrated circuit chip under design. The first features can comprise, for example, any of deep trench features within the semiconductor substrate (e.g., deep trenches for deep trench isolation structures, deep trenches for deep trench capacitor structures, etc.); diffusion regions within the semiconductor substrate; polysilicon features on the semiconductor substrate (e.g., polysilicon gate structures, polysilicon resistor structures, etc.); local interconnect features (e.g., metallic structures for connecting some combination of deep trench, diffusion, polysilicon, and/or first level metal features); via interconnect features (e.g., metallic structures to connect adjacent metal wiring levels); or other metal features in the metal levels above the semiconductor substrate (e.g., metal vias, metal wires, etc.). When any selected functional library element placed in the layout by the placement tool 132 violates the first density rule directed to the first features, the placement tool 132 can also select and place, in the layout, at least one selected hybrid fill-placeable library element.

Figure 3:
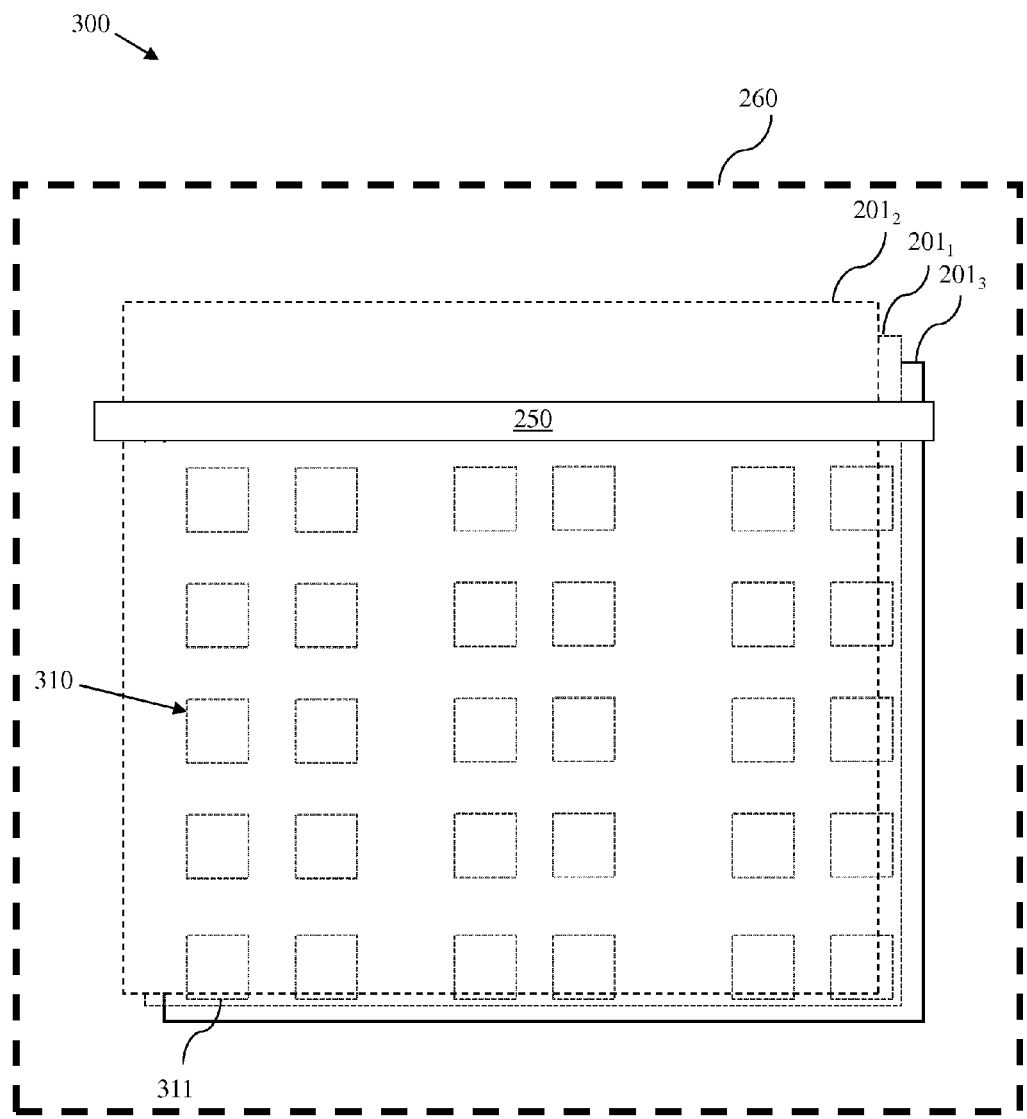
FIG. 3 is a diagram illustrating another hybrid fill-placeable library element.

For example, FIG. 3 illustrates an exemplary selected hybrid fill-placeable library element 300 that can be selected and placed in the layout of the integrated circuit chip under design in order to meet that first density rule at either the tile-level or the product-level. This selected hybrid fill-placeable library element 300 can comprise all of the features of the hybrid fill-placeable library element 200 shown in FIG. 2 as well as a first pattern 310 of first fill shapes 311. The first fill shapes 311, as mentioned above, are electrically non-functional and can correspond to the first features at issue in the first density rule. Placement of the selected hybrid fill-placeable library element(s) 300 within the layout of the integrated circuit chip can be made at one or more locations (e.g., as defined by a placement algorithm executed by the placement tool 132) in order to balance out the violation of the first density rule by the selected functional library element(s) and, thereby to ensure that the first density rule is met at the tile-level or product-level, as applicable.

That is, if the first density rule is a minimum density rule for first features (e.g., deep trench features) and if a group of one or more selected functional library elements placed in the layout does not meet that minimum density rule (i.e., if the density of the deep trench features in a group of one or more selected functional library elements is lower than the minimum density established by the minimum density rule), the placement tool 132 can select and place at least one selected hybrid fill-placeable library element, such as the selected hybrid fill-placeable library element 300, as shown in FIG. 3, in the layout of the integrated circuit chip under design in order to meet that first density rule at either the tile-level or the product-level. This selected hybrid fill-placeable library element 300 can comprise first fill shapes 311 in a first pattern 310 that has a higher density than that established by the first density rule in order to balance out the violation of the first density rule by the selected functional library element. Alternatively, if first density rule is a maximum density rule for the first features (e.g., deep trench features) and if a group of one or more selected functional library elements placed in the layout does not meet that maximum density rule (i.e., if the density of the deep trench features in a group of one or more selected functional library elements is higher than the maximum density established by the maximum density rule), the placement tool 132 can select and place at least one selected hybrid fill-placeable library element, such as the selected hybrid fill-placeable library element 300, as shown in FIG. 3, in the layout of the integrated circuit chip under design in order to meet that first density rule at either the tile-level or the product-level. This selected hybrid fill-placeable library element 300 can comprise first fill shapes 311 in a first pattern 310 that has a lower density than that established by the first density rule in order to balance out the violation of the first density rule by the selected functional library element.

It should be noted that, as mentioned above, each hybrid fill-placeable library element 300 can also comprise a corresponding marker shape 260. This corresponding marker shape 260 can provide an instruction, which defines one or more custom design rules and, particularly, custom feature density rules that can be executed by a processor of the computer-aided design system during design rule checking and, particularly, during design rule compliance verification to override any global design rule violations. In this case, at least one of the custom feature density rules can be directed to the density of the first fill shapes in order to override a violation, by the element 300, of a global feature density rule directed to the first features.

For example, if a selected hybrid fill-placeable library element, which is used to balance out a violation of a minimum density rule in a group of one or more selected functional library elements, actually violates a maximum density rule associated with those first features, the corresponding marker shape will provide an instruction that defines a custom maximum density rule for the first fill shapes within the selected hybrid fill-placeable library element. This custom maximum density rule will override any violation of the maximum density rule by that selected hybrid fill-placeable library element for purposes of design rule checking. Similarly, if a selected hybrid fill-placeable library element, which is used to balance out a violation of a maximum density rule in a group of one or more selected functional library elements, actually violates a minimum density rule associated with the first features, the corresponding marker shape will provide an instruction that defines a custom minimum density rule for the first fill shapes within the selected hybrid fill-placeable library element. This custom maximum density rule will override any violation of the minimum density rule by that selected hybrid fill-placeable library element is for purposes of design rule checking.

Optionally, each selected hybrid fill-placeable library element can be employed (i.e., can be placed in the layout of the integrated circuit chip under design) to meet, at the tile-level or at the product-level, multiple different feature density rules directed to multiple different features at different mask layers. That is, the same selected hybrid fill-placeable library element can be employed (i.e., can be placed in the layout of the integrated circuit chip under design) to meet minimum density rules for deep trench features, diffusion regions, polysilicon features, local interconnect features, via interconnect features, other metal features, and so on, to meet maximum density rules for deep trench features, diffusion regions, polysilicon features, local interconnect features, via interconnect features, other metal features and so on, or to meet a combination of minimum density rules for some features and maximum density rules for other features.

Figure 4:
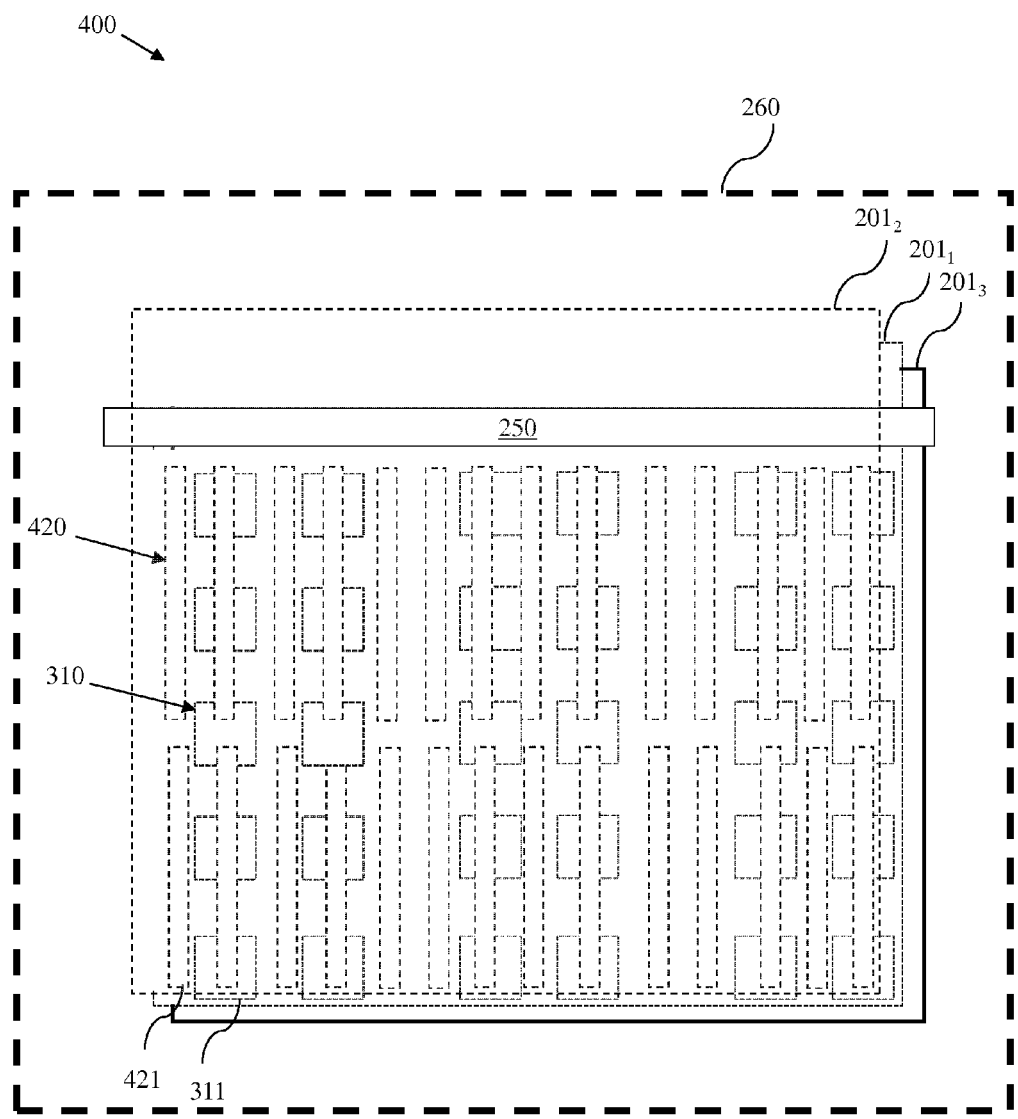
FIG. 4 is a diagram illustrating yet another hybrid fill-placeable library element.

For example, FIG. 4 illustrates an exemplary selected hybrid fill-placeable library element 400 that can be selected and placed in the layout of the integrated circuit chip under design in order to meet, at the tile-level or product-level, not only the first density rule, as discussed above, but also a second density rule directed to second features when any of the selected functional library elements violate the second density rule. In this case, the selected hybrid fill-placeable library element 400 can comprise all of the features of the hybrid fill-placeable library element 300 shown in FIG. 3 as well as a second pattern 420 of second fill shapes 421, which correspond to the second features (e.g., polysilicon features, such as polysilicon gate structures). Placement of the selected hybrid fill-placeable library element(s) 400 within the layout of the integrated circuit chip can be made at one or more locations (e.g., as defined by a placement algorithm executed by the placement tool 132) in order to balance out both violations of the first density rule and violations of the second density rule by the selected functional library element(s) and, thereby to ensure that both the first density rule and the second density rule are met at the tile-level or product-level, as applicable.

Figure 5:
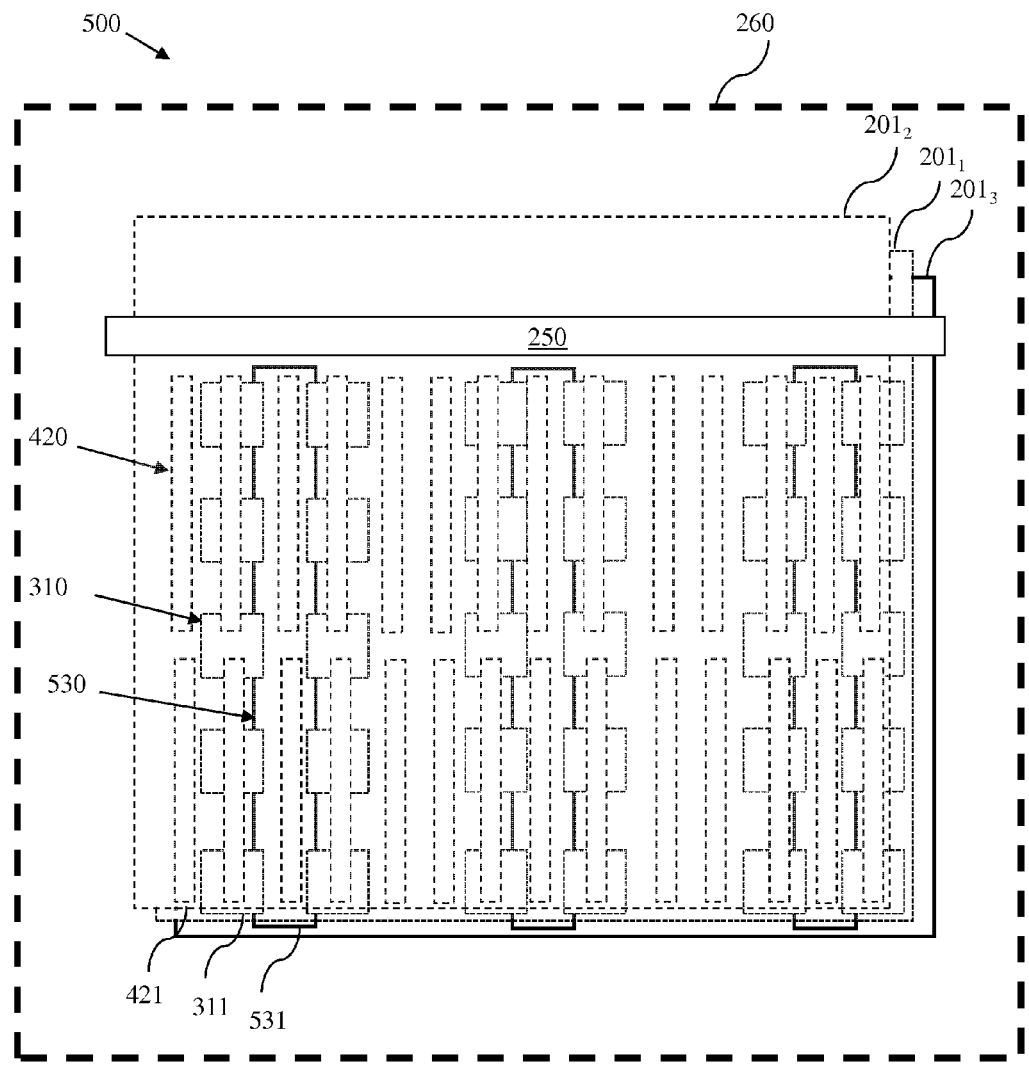
FIG. 5 is a diagram illustrating yet another hybrid fill-placeable library element.

FIG. 5 illustrates an exemplary selected hybrid fill-placeable library element 500 that can be placed in the layout of the integrated circuit chip under design in order to meet, at the tile-level or the product-level, not only the first density rule and the second density rule, as discussed above, but also a third density rule directed to third features when any of the selected functional library elements violate the third density rule. In this case, as illustrated in FIG. 5, the selected hybrid fill-placeable library element 500 can comprise all of the features of the hybrid fill-placeable library element 400 shown in FIG. 4 as well as a third pattern 530 of third fill shapes 531, which correspond to the third features (e.g., diffusion regions). Placement of the selected hybrid fill-placeable library element(s) 500 within the layout of the integrated circuit chip can be made at one or more locations (e.g., as defined by a placement algorithm executed by the placement tool 132) in order to balance out violations of the first density rule, violations of the second density rule and violations of the third density rule by the selected functional library element(s) and, thereby to ensure that the first density rule, the second density rule and the third density rule are met at the tile-level or product-level, as applicable.

Thus, selected hybrid fill-placeable library elements can be placed in the layout of the integrated circuit chip under design so that the completed IC design will preemptively meet one or more density rules directed to one or more different features, thereby minimizing the need for post-processing of the completed IC design to add fill shapes.

Figure 6:
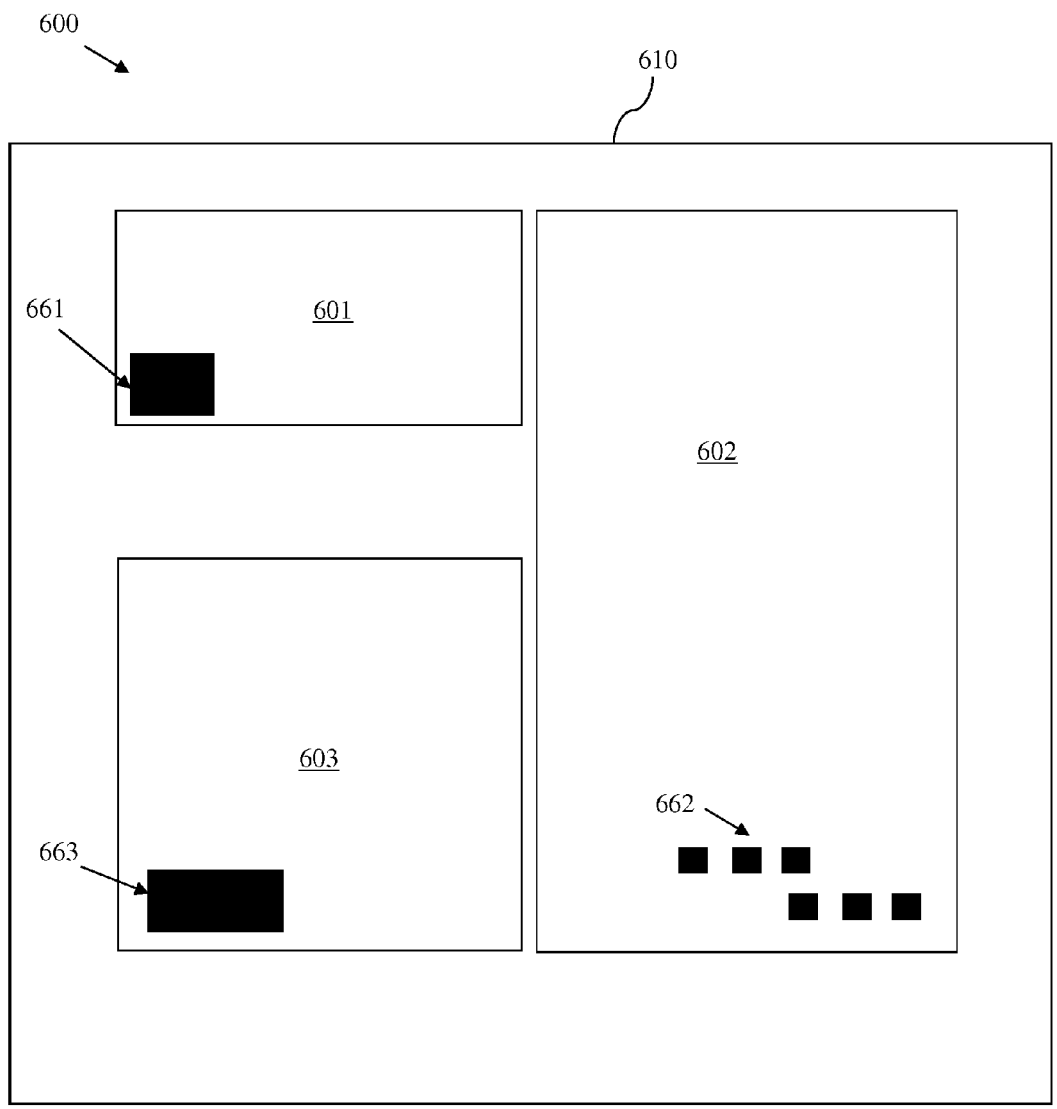
FIG. 6 is a diagram illustrating a layout of an integrated circuit chip under design following placement of standard cells.
Figure 7:
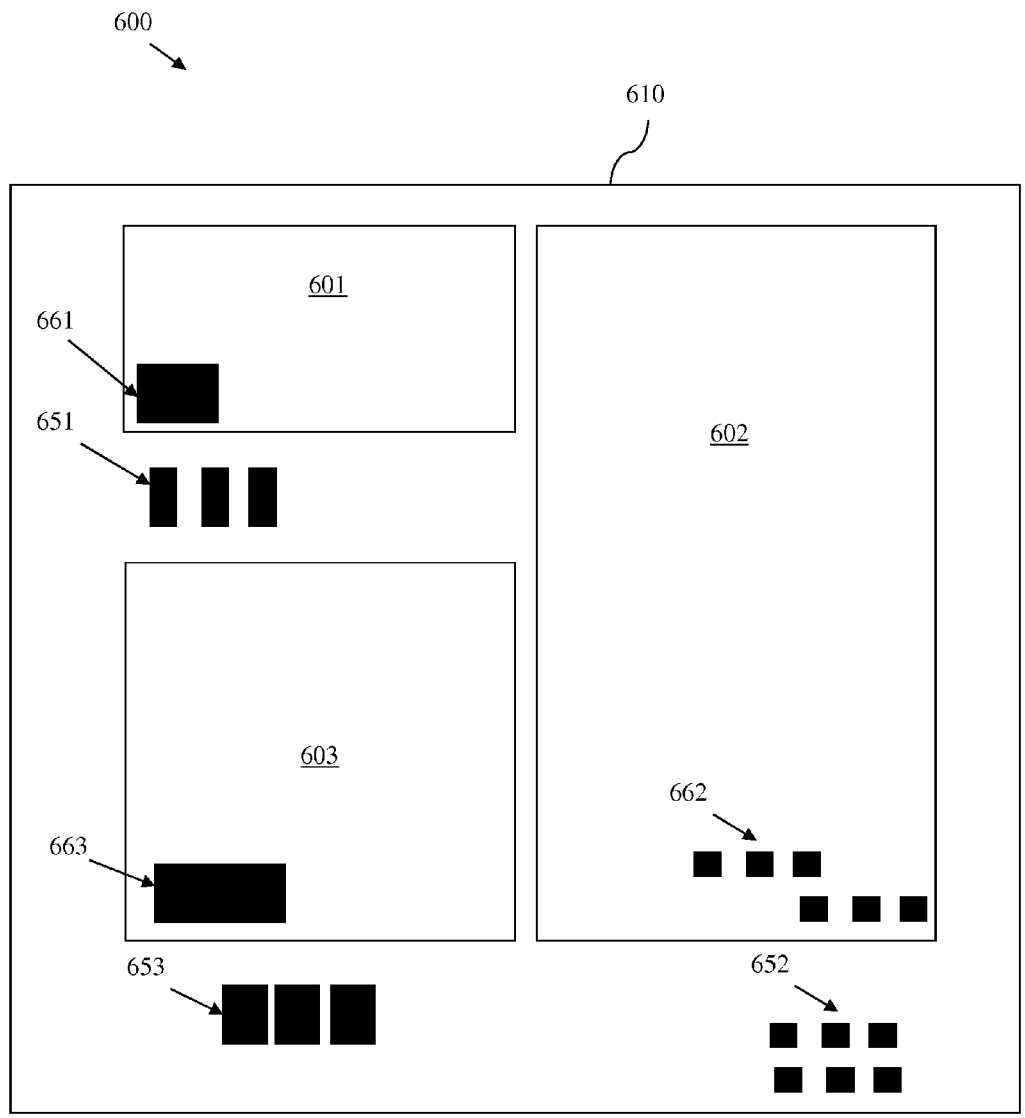
FIG. 7 is a diagram illustrating the layout of FIG. 3 following placement of selected hybrid fill-placeable library elements.

In practice operation of the placement tool 132 can vary depending upon the type of IC design. For example, for standard cell ASIC design, selected functional library elements and, particularly, standard cells can be placed to form blocks 601-603 (e.g., memory blocks, logic blocks, etc.) in a layout 600 of the integrated circuit chip under design in order to meet the product specifications, as shown in FIG. 6. Group(s) of one or more these standard cells (e.g., see standard cells 661-663) may violate one or more of the feature density rules. Then, as shown in FIG. 7, the placement tool 132 can execute the placement algorithm in order to define locations for placement of selected hybrid fill-placeable library elements 651-653 in the unused portion 610 of the layout 600 adjacent to the blocks 601-603 and, particularly, adjacent to the selected functional library elements 661-663, which are contained in those blocks and which violate one or more of the feature density rules, in order to subsequently meet those feature density rules. Once the locations are defined, the placement tool 132 can place the selected hybrid fill-placeable library elements 651-653 at those defined locations. The selected hybrid fill-placeable library elements 651-653 can be different in order to meet different density rules violated by different groups of one or more of the selected functional library elements. For example, the selected hybrid fill-placeable library elements 651-653 can comprise different hybrid fill-placeable library elements having different types of fill shapes in different mask layers, the selected hybrid fill-placeable library elements 651-653 can have different sizes to accommodate patterns that consume different amounts of the integrated circuit chip surface area, etc. Additionally, different numbers of the different types of selected hybrid fill-placeable library elements can be used, as necessary.

Figure 8:
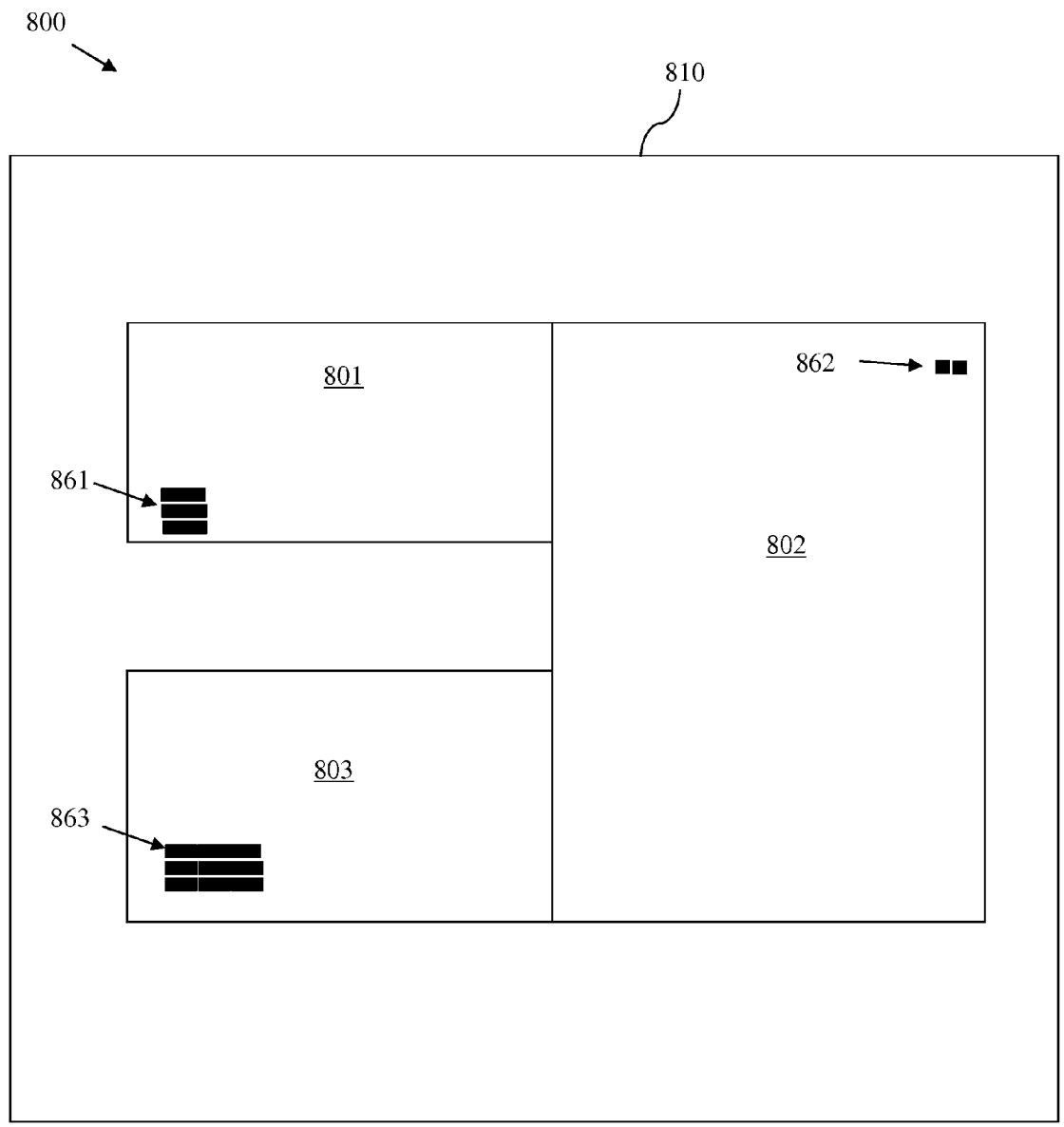
FIG. 8 is a diagram illustrating another layout of an integrated circuit chip under design following placement of standard cells.
Figure 9:
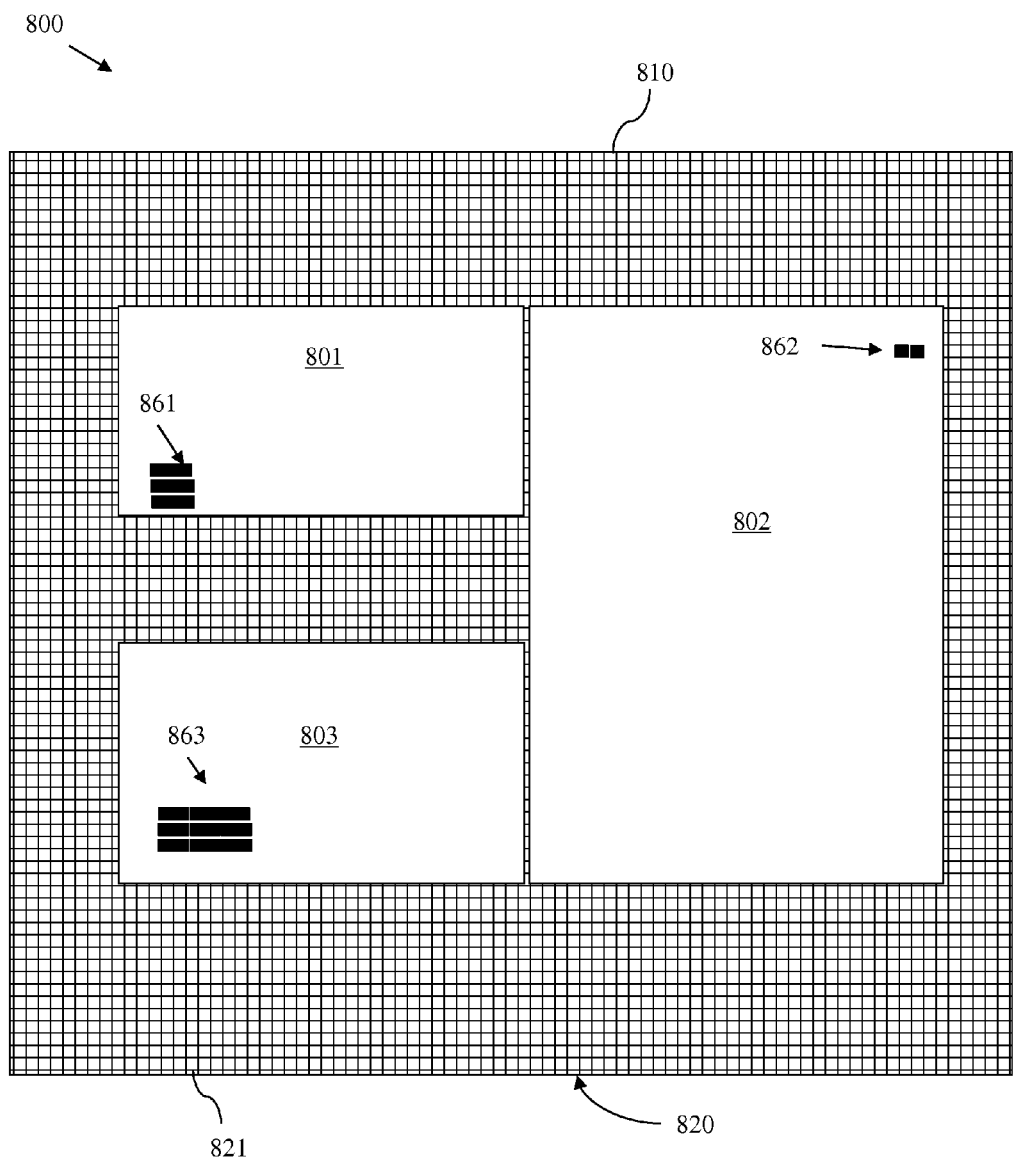
FIG. 9 is a diagram illustrating the layout of FIG. 8 following placement of gate array base cells in open areas adjacent to the standard cells.
Figure 10:
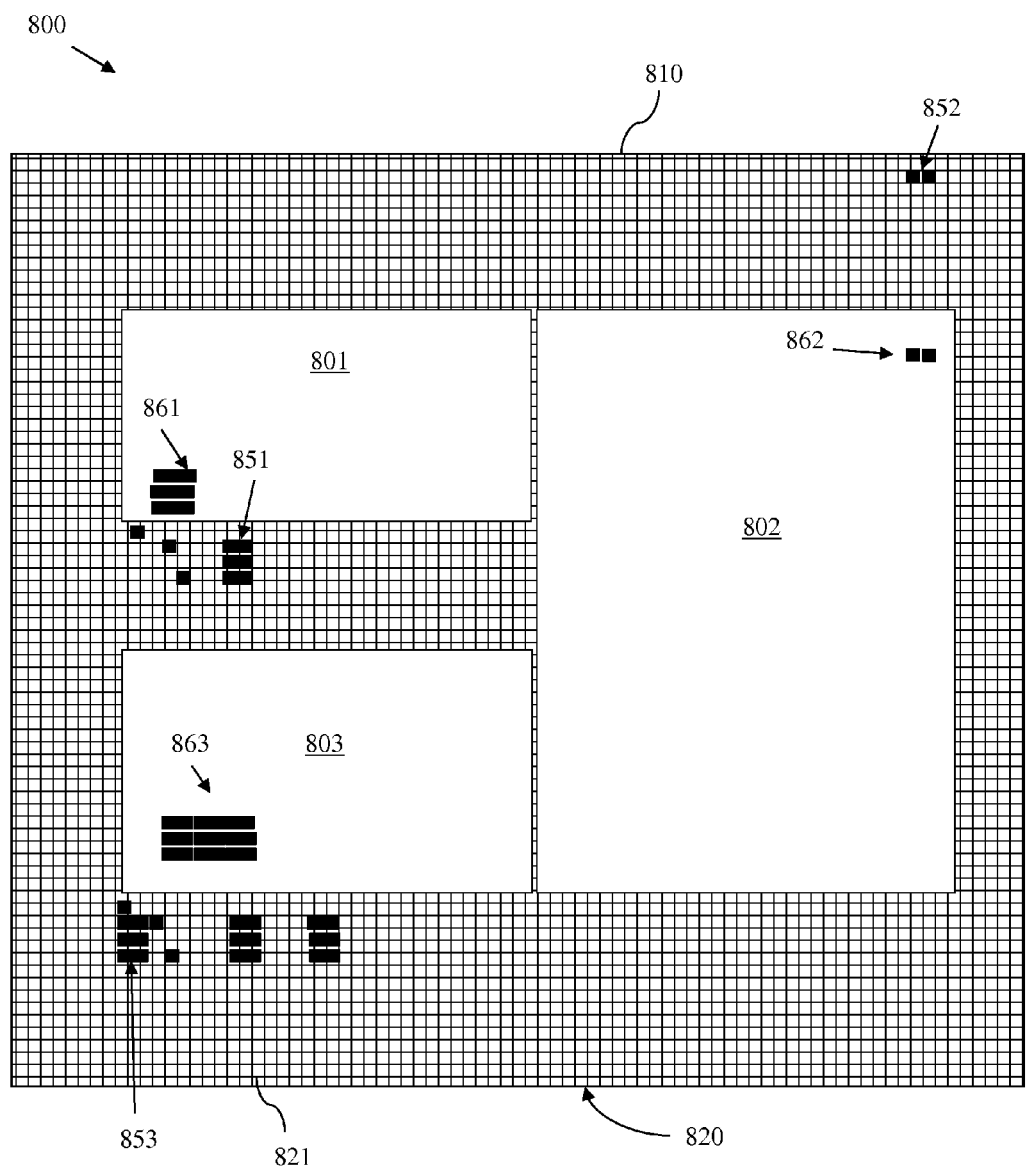
FIG. 10 is a diagram illustrating the layout of FIG. 9 following replacement of some of the gate array base cells with selected hybrid fill-placeable library elements.

For embedded array ASIC design, selected functional library elements and, particularly, standard cells can be placed to form blocks 801-803 (e.g., memory blocks, logic blocks, etc.) in a layout 800 of the integrated circuit chip under design in order to meet the product specifications, as shown in FIG. 8. Group(s) of one or more of these standard cells (e.g., see standard cells 861-863) may violate one or more of the feature density rules. Then, additional selected functional library elements and, particularly, gate array base cells 821 can be placed in the unused portion 810 of the layout 800 in order to form a gate array 820, as shown in FIG. 9. The placement tool 132 can then execute the placement algorithm in order to define locations for placement of selected hybrid fill-placeable library elements 851-853 in the gate array 820 adjacent to the blocks 801-803 and, particularly, adjacent to the selected functional library elements 861-863, which are contained in those blocks 801-803 and which violate one or more of the feature density rules, in order to subsequently meet those feature density rules. Once the locations are defined, the placement tool 132 can replace any of the gate array base cells 821 in the gate array 820 at those defined locations with selected hybrid fill-placeable library elements 851-853, as shown in FIG. 10. The selected hybrid fill-placeable library elements 851-853 can be different in order to meet different feature density rules. For example, the selected hybrid fill-placeable library elements 851-853 can comprise different hybrid fill-placeable library elements having different types of fill shapes in different mask layers. Additionally, different numbers of the different types of selected hybrid fill-placeable library elements can be used, as necessary. It should be noted that in this case the selected hybrid fill-placeable library elements 851-853 can each be compatible in size with the gate array base cells within the gate array 820 to allow for easy replacement.

Referring again to FIG. 1, once placement is performed, the processor(s) 120 can execute the routing tool 135 to perform routing (e.g., to define the wires that will interconnect the library elements) and can further execute the timing analysis tool 134 to perform timing analysis. Logic synthesis, placement, routing, and timing can be iteratively repeated, as necessary, by the appropriate tools, as necessary, in order to complete the IC design.

Following completion of the IC design, the processor(s) 120 can execute the mask layout generation tool 136 in order to generate a mask layout for the completed IC design based on data and information accumulated during the previous processing. This mask layout can define, in hierarchical form, the detailed geometric shapes, text labels, and other information required for each mask level to be used in the actual fabrication of the integrated circuit under design. This mask layout can be stored, for example, in an industry standard database file format, such as Graphic Data System II (GDSII) or Oasis.

Optionally, following mask layout generation, the processor(s) 120 can execute a design rule checking tool 133 in order to perform a design rule checking process and, more particularly, a design rule compliance verification process to confirm compliance with all of the global design rules for the given technology as well as the custom feature density rules specified by the marker shapes of the selected hybrid fill-placeable library elements. It should be noted that, because this system 100 incorporates the use of hybrid fill-placeable library elements, which ensure that the completed IC design will meet the global design rules for a given technology at the tile-level or product level and which incorporate marker shapes with custom design rules to override internal design rule violations, the need to perform design rule checking prior to mask layout generation can be eliminated.

The mask layout can subsequently proceed to tape-out (e.g., can be released to manufacturing, can be released to a mask house, can be sent to another design house, can be sent back to a customer, etc.).

A computer-aided design system 100, such as that described in detail above and illustrated in FIG. 1, has the advantage of minimizing the risk of defect formation during fabrication of an integrated circuit chip by designing the integrated circuit chip so as to comply with global design rules that are set to minimize variation in the completed mask image on the product after lithographic, planarization, or etch processing. Since the integrated circuit chip is designed to meet these design rules, post-processing of the completed IC design to add fill shapes is avoided.

Figure 11:
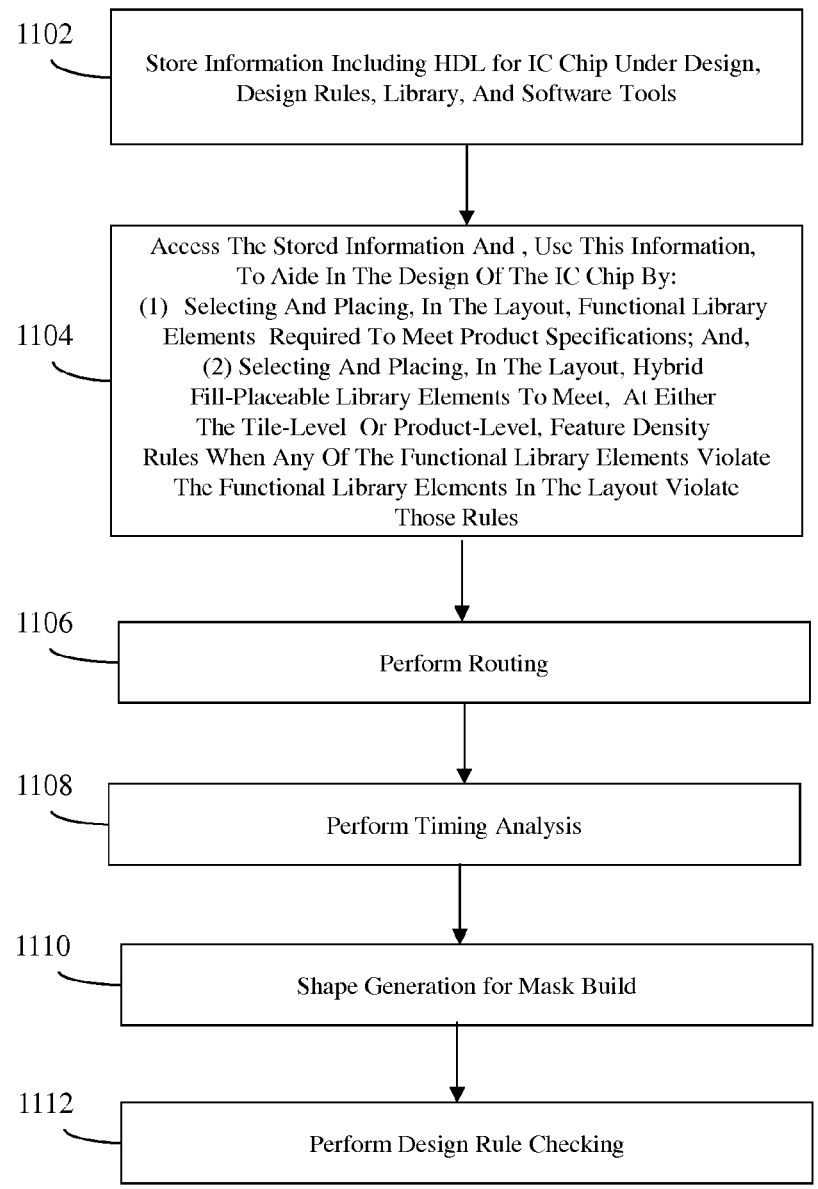
FIG. 11 is a flow diagram illustrating a computer-aided design method.

FIG. 11 is a flow diagram illustrating a computer-aided design method that incorporates the use of a combination of both functional library elements and hybrid fill-placeable library elements in order to generate an integrated circuit (IC) design (e.g., an application-specific integrated circuit (ASIC) design) that meets both product specifications and feature density rules, thereby minimizing the need for post-processing of the completed IC design to add fill shapes.

Referring to FIG. 11 in combination with the computer-aided design system 100 of FIG. 1, the method can comprise storing (e.g., in one or more memory devices 110 of the system 100, as shown in FIG. 1) information including, but not limited to, data and instructions required for designing an integrated circuit chip (1102). This information can include a high-level description 111 of an integrated circuit chip under design in a given technology, a library 113 (e.g., an application specific integrated circuit (ASIC) library), design rules 112, and various software tools 130.

The high-level description 111 can describe the product specifications for the integrated circuit chip under design and the design rules can specifically comprise feature density rules 112 associated with the given technology within which the integrated circuit chip is being designed. These feature density rules 112 can comprise, for example, minimum and/or maximum density requirements for different features, which will be defined during manufacturing using different mask layers. For example, the feature density rules 112 can comprise minimum and/or maximum density requirements for deep trench features within the semiconductor substrate (e.g., deep trenches for isolation structures within the semiconductor substrate, deep trenches for deep trench capacitor structures within the semiconductor substrate, etc.). The feature density rules 112 can also comprise minimum and/or maximum density requirements for diffusion regions within the semiconductor substrate. The feature density rules 112 can also comprise minimum and/or maximum density requirements for polysilicon features on the semiconductor substrate (e.g., for polysilicon gate structures on the semiconductor substrate, polysilicon resistor structures on the semiconductor substrate, etc.). The feature density rules 112 can also comprise minimum and/or maximum density requirements for various metal features including, for example, local interconnect features (e.g., metallic structures for connecting some combination of deep trench, diffusion, polysilicon, and/or first level metal features); via interconnect features (e.g., metallic structures to connect adjacent metal wiring levels); or other metal features within the metal levels above the semiconductor substrate (e.g., metal vias, metal wires, etc.).

The library 113 can comprise pre-qualified library elements including both functional library elements 114 and hybrid fill-placeable library elements 115. The functional library elements 114 can comprise multi-layered data structures, wherein the layers of the data structures generally represent (i.e., define) different mask layers required for manufacture of different features on the integrated circuit chip. Those skilled in the art will recognize that such functional library elements 114 will vary depending upon the type of IC design being employed.

For example, for standard cell ASIC design the functional library elements 114 can comprise standard cells. For gate array ASIC design the functional library elements 114 can comprise gate array base cells. For embedded array ASIC design, the functional library elements 114 can comprise both standard cells and gate array base cells. The hybrid fill-placeable library elements 115 can have the same form factor as the functional library elements 114. That is, the hybrid fill-placeable library elements 115 can also comprise multi-layered data structures. Although they have the same form factor as the functional library elements 114 and are multi-layered data structures, the hybrid fill-placeable library elements 115 represent electrically non-functional elements.

As illustrated in FIG. 2, each hybrid fill-placeable library element 200 can specifically comprise multiple layers $201_{1-3}$. These layers $201_{1-3}$ can generally represent (i.e., define) different mask layers required for manufacture of different fill shapes corresponding to the different features in the different mask layers of the functional library elements 114. For example, the layer $201_1$ can represent a first mask layer for first fill shapes corresponding to first features, layer $201_2$ can represent a second mask layer for second feature, layer $201_3$ can represent a third mask layer for third features, and so on. As mentioned above, the hybrid fill-placeable library elements are electrically non-functional and, thus, any of the fill shapes contained therein are also electrically non-functional. For illustration purposes, three distinct mask layers are shown in the hybrid fill-placeable library element 200. However, those skilled in the art will recognize that the number of different mask layers would typically be between 10 and 80 with approximately half of those different mask layers corresponding to layers for device features (e.g., deep trench features, diffusion regions, polysilicon features, local interconnect features, via interconnect features, etc.) within and/or on a semiconductor substrate and approximately half corresponding to layers for metal features (e.g., vias, wires, etc.) in the metal levels above the semiconductor substrate. Additionally, although, as mentioned above, the hybrid fill-placeable library elements and fill shapes contained therein are electrically non-functional, each hybrid fill-placeable library element 200 can comprise product-level power and ground through lines 250 allowing for integration of other library elements within the layout. That is, because of the product-level power and ground through-lines 250 (i.e., power and ground wires that pass through each hybrid fill-placeable library element 200, functional library elements 114 physically separated by one or more of the hybrid fill-placeable library elements can be electrically connected to each other. Each hybrid fill-placeable library element 200 can further comprise a corresponding marker shape 260. This corresponding marker shape 260 can provide an element-specific instruction, which defines one or more custom design rules and, particularly, custom feature density rules to be applied to that element (see detailed discussion below).

The software tools 130 can comprise programs of instructions executable (e.g., by processor(s) 120 of the system 100, as shown in FIG. 1) for performing various different functions. These software tools 130 can include, but are not limited to, a logic simulation tool 137, a logic synthesis tool 131, a library element placement tool 132, a routing tool 135, a timing analysis tool 134, mask layout generation tool 136 and a design rule checking tool 133.

The method can further comprise accessing the memory device(s) 110 and, particularly, the information stored therein (e.g., the high-level description 111 of the integrated circuit chip under design, the design rules 112, the library 113 and the software tools 130) and using that information to aide in the design of an integrated circuit chip (e.g., by executing the software tools 130) to select and place functional library elements 114 in the layout of the integrated circuit chip under design in order to meet product specifications as set forth in the high-level description language 111 and to further select and place hybrid fill-placeable library elements 115 at various locations within that layout in order to meet one or more the feature density rules 112 at either the product-level or tile-level (1104). For purposes of this disclosure, meeting a feature density rule at the "product-level" means that the feature density specified in the rule is met for the full layout of the integrated circuit chip. Alternatively, the full layout of the integrated circuit chip can be divided into a grid pattern of essentially identical rectangular or square-shaped sections or tiles, referred to herein as "tiles", where each tile can comprise multiple library elements. Meeting a feature density at the tile-level means that the feature density specified in the rule is met for one of these tiles.

Figure 12:
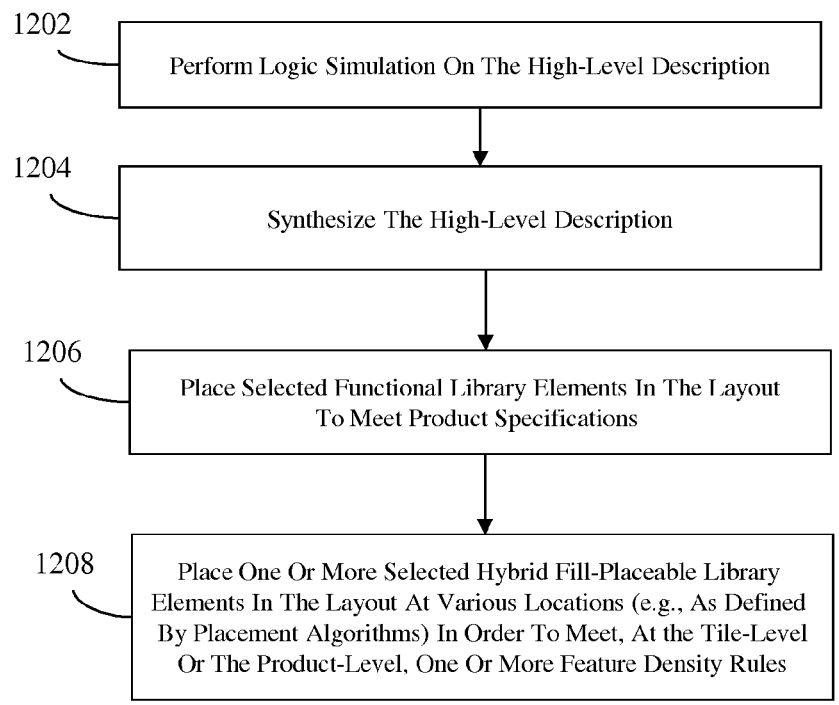
FIG. 12 is a flow diagram illustrating in greater detail the process 1104 of FIG. 11.

FIG. 12 is a flow diagram illustrating in greater detail the process 1104 of FIG. 11. This process 1104 can comprise performing logic simulation (e.g., by a processor 120 of the computer-aided design system 100 executing the logic simulation tool 137) on the high-level description 111 of the integrated circuit chip under design in order to verify the description logic (1202). This process 1104 can further comprise synthesizing (e.g., by a processor 120 of the computer-aided design system 100 executing the logic synthesis tool 131) the high-level description 111 of the integrated circuit chip under design into an optimized lower-level description (e.g., a gate level netlist) that meets the product design specifications (1204).

For example, in the case of standard cell ASIC design, the logic synthesis tool 131 can select low-level components and, particularly, the functional library elements 114 (which in this case would be standard cells) from the ASIC library 113 in order to generate a gate level netlist for a product that meets the product specifications. Alternatively, in the case of gate array ASIC design, the logic synthesis tool 131 can select low-level components and, particularly, functional library elements 114 (which in this case would be gate array base cells) for a gate array from the ASIC library 113 in order to generate a gate level netlist for a product that meets the product specifications.

The process 1104 can further comprise converting (e.g., by a processor 120 of the computer-aided design system 100 executing the placement tool 132) the low-level description of the integrated circuit chip (i.e., the gate level netlist) into an initial layout for the integrated circuit chip, which includes both selected functional library elements and selected hybrid fill-placeable library elements. Specifically, functional library elements 114 as set forth in the low-level description can be placed in a layout of the integrated circuit chip under design such that the product specifications are met (1206). In addition, one or more hybrid fill-placeable library elements 115 from the library 113 can be selected and the selected hybrid fill element(s) can be placed into the layout at one or more different locations (e.g., as defined by placement algorithms) in order to meet, at either the tile-level or product-level, one or more of the feature density rules 112 (1208).

For example, a first density rule $112_1$ can specify a first density requirement (e.g., either a minimum density requirement or a maximum density requirement) for first features on the integrated circuit chip under design. The first features can comprise, for example, any of deep trench features within the semiconductor substrate (e.g., deep trenches for deep trench isolation structures, deep trenches for deep trench capacitor structures, etc.); diffusion region features within the semiconductor substrate; polysilicon features on the semiconductor substrate (e.g., polysilicon gate structures, polysilicon resistor structures, etc.); local interconnect features (e.g., metallic structures for connecting some combination of deep trench, diffusion, polysilicon, and/or first level metal features); via interconnect features (e.g., metallic structures to connect adjacent metal wiring levels); or other metal features in the metal levels above the semiconductor substrate (e.g., metal vias, metal wires, etc.). When any groups of one or more selected functional library elements placed in the layout by the placement tool 132 at process 1206 violates the first density rule directed to the first features, then at process 1208 at least one selected hybrid fill-placeable library element can be placed in the layout of the integrated circuit chip under design in order to meet that first density rule at either the tile-level or the product-level.

FIG. 3 is an illustration of an exemplary selected hybrid fill-placeable library element 300 that can be placed in the layout. This selected hybrid fill-placeable library element 300 can comprise all of the features of the hybrid fill-placeable library element 200 of FIG. 2 and can comprise a first pattern 310 of first fill shapes 311. The first fill shapes 311, as mentioned above, are electrically non-functional and can correspond to the first features at issue in the first density rule. Placement of the selected hybrid fill-placeable library element(s) 300 within the layout of the integrated circuit chip can be made at one or more locations (e.g., as defined by a placement algorithm executed by the placement tool 132) in order to balance out the violation of the first density rule by the selected functional library element(s) and, thereby to ensure that the first density rule is met at the tile-level or product-level, as applicable.

That is, if the first density rule is a minimum density rule for first features (e.g., deep trench features) and if a group of one or more selected functional library elements placed in the layout at process 1206 does not meet that minimum density rule (i.e., if the density of the deep trenches in a group of one or more selected functional library elements is lower than the minimum density established by the minimum density rule), then at process 1208 at least one selected hybrid fill-placeable library element, such as the selected hybrid fill-placeable library element 300, as shown in FIG. 3, can be placed in the layout of the integrated circuit chip under design in order to meet that first density rule at either the tile-level or the product-level. This selected hybrid fill-placeable library element 300 can comprise first fill shapes 311 in a first pattern 310 that has a higher density than that established by the first density rule in order to balance out the violation of the first density rule by the selected functional library element. Alternatively, if first density rule is a maximum density rule for the first features (e.g., deep trench features) and if a group of one or more selected functional library elements placed in the layout at process 1206 does not meet that maximum density rule (i.e., if the density of the deep trenches in a group of one or more selected functional library elements is higher than the maximum density established by the maximum density rule), then at process 1208 at least one selected hybrid fill-placeable library element, such as the selected hybrid fill-placeable library element 300, as shown in FIG. 3, can be placed in the layout of the integrated circuit chip under design in order to meet that first density rule at either the tile-level or the product-level. This selected hybrid fill-placeable library element 300 can comprise first fill shapes 311 in a first pattern 310 that has a lower density than that established by the first density rule in order to balance out the violation of the first density rule by the selected functional library element.

It should be noted that, as mentioned above, each hybrid fill-placeable library element 300 can also comprise a corresponding marker shape 260. This corresponding marker shape 260 can provide an instruction, which defines one or more custom design rules and, particularly, custom feature density rules that can be executed by a processor of the computer-aided design system during design rule checking and, particularly, during design rule compliance verification to override any global design rule violations. In this case, at least one of the custom feature density rules can be directed to the density of the first fill shapes in order to override a violation, by the element 300, of a global feature density rule directed to the first features.

For example, if a selected hybrid fill-placeable library element, which is used to balance out a violation of a minimum density rule in a group of one or more selected functional library elements, actually violates a maximum density rule associated with those first features, the corresponding marker shape will provide an instruction that defines a custom maximum density rule for the first fill shapes within the selected hybrid fill-placeable library element. This custom maximum density rule will override any violation of the maximum density rule by that selected hybrid fill-placeable library element for purposes of design rule checking. Similarly, if a selected hybrid fill-placeable library element, which is used to balance out a violation of a maximum density rule in a group of one or more selected functional library elements, actually violates a minimum density rule associated with the first features, the corresponding marker shape will provide an instruction that defines a custom minimum density rule for the first fill shapes within the selected hybrid fill-placeable library element. This custom maximum density rule will override any violation of the minimum density rule by the selected hybrid fill-placeable library element(s) for purposes of design rule checking.

Optionally, each selected hybrid fill-placeable library element 300 can be employed (i.e., can be placed in the layout of the integrated circuit chip under design) to meet, at the tile-level or at the product-level, multiple different feature density rules directed to multiple different features at different mask layers. That is, the same selected hybrid fill-placeable library element can be employed (i.e., can be placed in the layout of the integrated circuit chip under design at process 1208) to meet minimum density rules for deep trench features, diffusion regions, polysilicon features, local interconnect features, via interconnect features, other metal features, and so on, to meet maximum density rules for deep trench features, diffusion regions, polysilicon features, local interconnect features, via interconnect features, other metal features and so on, or to meet a combination of minimum density rules for some features and maximum density rules for other features.

For example, FIG. 4 illustrates an exemplary selected hybrid fill-placeable library element 400 that can be placed in the layout of the integrated circuit chip under design at process 1208 in order to meet, at the tile-level or product-level, not only the first density rule, as discussed above, but also a second density rule directed to second features when any of the selected functional library elements violate the second density rule. In this case, as illustrated in FIG. 4, the selected hybrid fill-placeable library element 400 can comprise all of the features of the selected hybrid fill-placeable library element 300 of FIG. 3 as well as a second pattern 320 of second fill shapes 321, which correspond to the second features (e.g., polysilicon features, such as polysilicon gate structures). Placement of the selected hybrid fill-placeable library element(s) 300 within the layout of the integrated circuit chip can be made at one or more locations (e.g., as defined by a placement algorithm executed by the placement tool 132) in order to balance out both violations of the first density rule and violations of the second density rule by the selected functional library element(s) and, thereby to ensure that both the first density rule and the second density rule are met at the tile-level or product-level, as applicable.

FIG. 5 illustrates an exemplary selected hybrid fill-placeable library element 500 that can be placed in the layout of the integrated circuit chip under design at process 1208 in order to meet, at the tile-level or the product-level, not only the first density rule and the second density rule, as discussed above, but also a third density rule directed to third features when any of the selected functional library elements violate the third density rule. In this case, as illustrated in FIG. 5, the selected hybrid fill-placeable library element 300 can comprise all of the features of the selected hybrid fill-placeable library element 400 of FIG. 4 and a third pattern 330 of third fill shapes 331, which correspond to the third features (e.g., diffusion regions). Placement of the selected hybrid fill-placeable library element(s) 300 within the layout of the integrated circuit chip can be made at one or more locations (e.g., as defined by a placement algorithm executed by the placement tool 132) in order to balance out violations of the first density rule, violations of the second density rule and violations of the third density rule by the selected functional library element(s) and, thereby to ensure that the first density rule, the second density rule and the third density rule are met at the tile-level or product-level, as applicable.

Thus, selected hybrid fill-placeable library elements can be placed in the layout of the integrated circuit chip under design at process 1208 of FIG. 12 so that the completed IC design will pre-emptively meet one or more density rules directed to one or more different features, thereby minimizing the need for post-processing of the completed IC design to add fill shapes.

Figure 13:
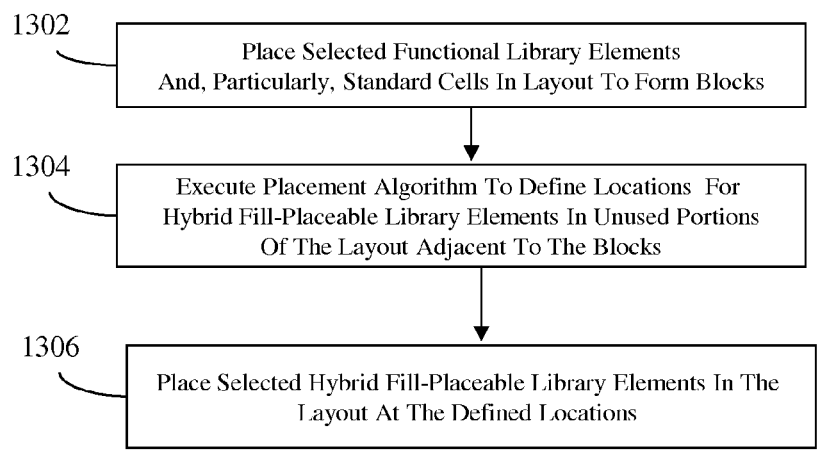
FIG. 13 is a flow diagram illustrating in greater detail the process 1208 of FIG. 12 specifically for standard cell ASIC design.

In practice this placement process 1208 of FIG. 12 can vary depending upon the type of IC design. For example, referring to FIG. 13, for standard cell ASIC design, selected functional library elements and, particularly, standard cells can be placed to form blocks 601-603 (e.g., memory blocks, logic blocks, etc.) in a layout 600 of the integrated circuit chip under design in order to meet the product specifications, as shown in FIG. 6 (1302). Group(s) of one or more of these standard cells (e.g., see standard cells 661-663) may violate one or more of the feature density rules. Then, a placement algorithm can be executed in order to define locations for placement of selected hybrid fill-placeable library elements 651-653 in the unused portion 610 of the layout 600 adjacent to the blocks 601-603 and, particularly, adjacent to the selected functional library elements 661-663, which are contained in those blocks and which violate one or more of the feature density rules, in order to subsequently meet those feature density rules (1304). Once the locations are defined, the selected hybrid fill-placeable library elements 651-653 can be placed at those defined locations, as shown in FIG. 7 (1306). The selected hybrid fill-placeable library elements 651-653 can be different in order to meet different density rules violated by different groups of one or more of the selected functional library elements. For example, the selected hybrid fill-placeable library elements 651-653 can comprise different hybrid fill-placeable library elements having different types of fill shapes in different mask layers, the selected hybrid fill-placeable library elements 651-653 can have different sizes to accommodate patterns that consume different amounts of the integrated circuit chip surface area, etc. Additionally, different numbers of the different types of selected hybrid fill-placeable library elements can be used, as necessary.

Figure 14:
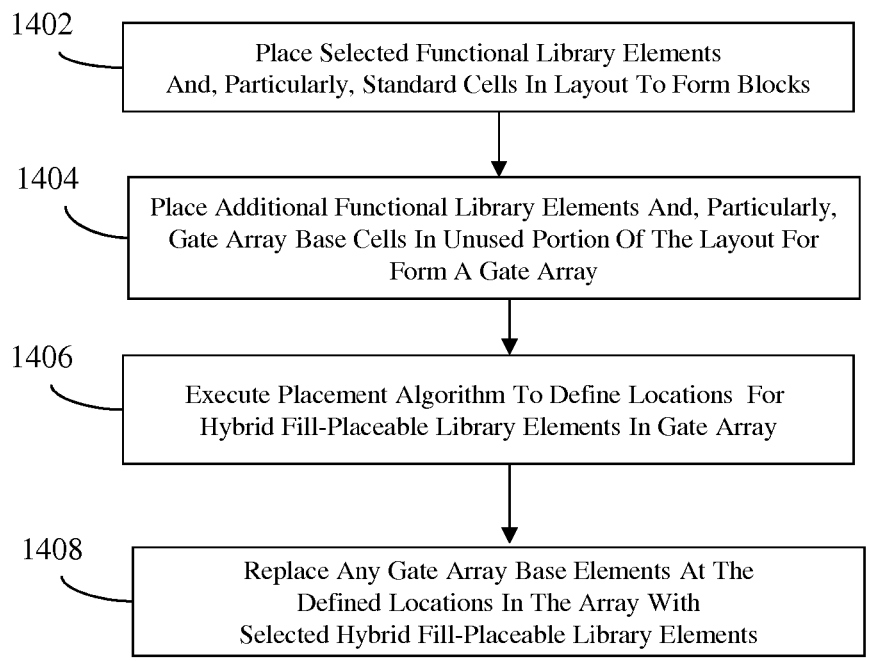
FIG. 14 is a flow diagram illustrating in greater detail the process 1208 of FIG. 12 specifically for embedded array ASIC design.

Referring to FIG. 14, for embedded array ASIC design, selected functional library elements and, particularly, standard cells can be placed to form blocks 801-803 (e.g., memory blocks, logic blocks, etc.) in a layout 800 of the integrated circuit chip under design in order to meet the product specifications, as shown in FIG. 8 (1402). Group(s) of one or more of these standard cells (e.g., see standard cells 861-863) may violate one or more of the feature density rules. Then, additional selected functional library elements and, particularly, gate array base cells 821 can be placed in the unused portion 810 of the layout 800 in order to form a gate array 820, as shown in FIG. 9 (1404). Next, the placement algorithm can be executed in order to define locations for placement of selected hybrid fill-placeable library elements 851-853 in the gate array 820 adjacent to the blocks 801-803 and, particularly, adjacent to the selected functional library elements 861-863, which are contained in those blocks 801-803 and which violate one or more of the feature density rules, in order to subsequently meet those feature density rules (1406). Once the locations are defined, any of the gate array base cells 821 in the gate array 820 at those defined locations can be replaced with selected hybrid fill-placeable library elements 851-853, as shown in FIG. 10 (1408). The selected hybrid fill-placeable library elements 851-853 can be different in order to meet different feature density rules. For example, the selected hybrid fill-placeable library elements 851-853 can comprise different hybrid fill-placeable library elements having different types of fill shapes in different mask layers. Additionally, different numbers of the different types of selected hybrid fill-placeable library elements can be used, as necessary. It should be noted that in this case the selected hybrid fill-placeable library elements 851-853 can each be compatible in size with the gate array base cells within the gate array 820 to allow for easy replacement.

Referring to again to FIG. 11 in combination with FIG. 1, once placement is performed at process 1104, routing can be performed (e.g., by a processor 120 executing the routing tool 135) to define the wires that will interconnect the library elements (1106) and, then, timing analysis can be performed (e.g., by a processor 120 executing the timing analysis tool 134) (1108). These processes may be repeated, as necessary, in order to complete the IC design.

Following completion of the IC design, a mask layout for the completed IC design can be generated (e.g., by a processor 120 executing a mask layout generation tool 136) (1110). The mask layout can be generated based on data and information accumulated during the previous processing. This mask layout can define, in hierarchical form, the detailed geometric shapes, text labels, and other information required for each mask level to be used in the actual fabrication of the integrated circuit under design. This mask layout can be stored, for example, in an industry standard database file format, such as Graphic Data System II (GDSII) or Oasis.

Optionally, following mask layout generation at process 1110, a design rule checking process and, particularly, a design rule compliance verification process can be performed (e.g., by a processor 120 executing a design rule checking tool 133) (1112). This design rule compliance verification process can be performed in order to confirm compliance with all of the global design rules for the given technology as well as custom design rules specified by the marker shapes of the selected hybrid fill-placeable library elements. It should be noted that, because this method incorporates the use of hybrid fill-placeable library elements, which ensure that the completed IC design will meet the global design rules for a given technology at the tile-level or product level and which incorporate marker shapes with custom design rules to override internal design rule violations, the need to perform design rule checking prior to mask layout generation can be eliminated.

The mask layout can subsequently proceed to tape-out (e.g., can be released to manufacturing, can be released to a mask house, can be sent to another design house, can be sent back to a customer, etc.).

A method, such as that described in detail above and illustrated in the flow diagrams of FIGS. 11-14, has the advantage of minimizing the risk of defect formation during fabrication of an integrated circuit chip by designing the integrated circuit chip so as to comply with global design rules that are set to minimize variation in the completed mask image on the product after lithographic, planarization, or etch processing. Since the integrated circuit chip is designed to meet these design rules, post-processing of the completed IC design to add fill shapes is avoided.

Also disclosed herein is a hybrid fill-placeable library element, such as the hybrid fill-placeable library element 500 of FIG. 5. As discussed in detail above with regard to the system and method, a hybrid fill-placeable library element 500 can be pre-qualified and stored, along with functional library elements and other hybrid fill-placeable library elements, in a library (e.g., an application specific integrated circuit (ASIC) library) on a computer-readable storage medium. The library and, particularly, the hybrid fill-placeable library element 500 in that library can be accessible by a computer (e.g., by a processor of a computer-aided design system 100 of FIG. 1) during application IC design.

The hybrid fill-placeable library element 500 can have the same form factor as the functional library elements in the library. That is, the hybrid fill-placeable library element 300 can comprise a multi-layered data structure (see layers $201_{1-3}$). Although it has the same form factor as the functional library elements, the hybrid fill-placeable library element represents an electrically non-functional element.

In any case, layers $201_{1-3}$ of the hybrid fill-placeable library element 500 can generally represent (i.e., define) different mask layers required for manufacture of different fill shapes corresponding to the different features in the different mask layers of the functional library elements in the library. For example, the layer $201_1$ can represent a first mask layer for first fill shapes corresponding to first features, layer $201_2$ can represent a second mask layer for second feature, layer $201_3$ can represent a third mask layer for third features, and so on. As mentioned above, the hybrid fill-placeable library element 500 is electrically non-functional and, thus, any of the fill shapes contained therein is also electrically non-functional. For illustration purposes, three distinct mask layers are shown in the hybrid fill-placeable library element 500. However, those skilled in the art will recognize that the number of different mask layers would typically be between 10 and 80 with approximately half of those different mask layers corresponding to layers for device features (e.g., deep trench features, diffusion regions, polysilicon features, local interconnect features, via interconnect features, etc.) within and/or on a semiconductor substrate and approximately half corresponding to layers for other metal features (e.g., vias, wires, etc.) in the metal levels above the semiconductor substrate.

The hybrid fill-placeable library element 500 can be selectable (e.g., by the computer) for placement in a layout of an integrated circuit chip under design in order to meet, at either a tile-level or a product-level, a first density rule directed to first features. The first features can comprise, for example, any of deep trench features within the semiconductor substrate (e.g., deep trenches for deep trench isolation structures, deep trenches for deep trench capacitor structures, etc.); diffusion regions within the semiconductor substrate; polysilicon features on the semiconductor substrate (e.g., polysilicon gate structures, polysilicon resistor structures, etc.); local interconnect features (e.g., metallic structures for connecting some combination of deep trench, diffusion, polysilicon, and/or first level metal features); via interconnect structures (e.g., metallic structures to connect adjacent metal wiring levels); or metal features in the metal levels above the semiconductor substrate (e.g., metal vias, metal wires, etc.). Specifically, the hybrid fill-placeable library element 500 can comprise a first pattern 310 of first fill shapes 311, which, as mentioned above, are electrically non-functional and which correspond to the first features (e.g., deep trench features). This hybrid fill-placeable library element 500 can be selectable (e.g., by the computer) for placement at one or more specific locations (e.g., as defined by a placement algorithm) within the layout of the integrated circuit chip under design when any functional library element(s) placed in the layout violate that first density rule, thereby balancing out any violations of the first density rule and ensuring that the first density rule is met at the tile-level or product-level, as applicable.

Optionally, the hybrid fill-placeable library element 500 can comprise, at different mask layers, different fill shapes corresponding to different features so that it can be employed to meet multiple different feature density rules (e.g., to meet minimum density rules for deep trenches, diffusion regions, polysilicon features, local interconnect features, via interconnect features, other metal features, and so on, to meet maximum density rules for deep trench features, diffusion regions, polysilicon features, local interconnect features, via interconnect features, other metal features, and so on, or to meet a combination of minimum density rules for some features and maximum density rules for other features).

For example, optionally, the hybrid fill-placeable library element 500 can further comprise a second pattern 420 of second fill shapes 421, which correspond to second features (e.g., polysilicon gate structures). Such a hybrid fill-placeable library element 500 can be selectable for placement in the layout of the integrated circuit chip under design in order to meet, at the tile-level or product-level, not only a first density rule, as discussed above, but also a second density rule directed to these second features when any of the selected functional library elements violate the second density rule. In this case, the first features and the second features can comprise any two of deep trench features, diffusion regions, polysilicon features, local interconnect features, via interconnect features, or other metal features. Optionally, the hybrid fill-placeable library element 500 can also comprise a third pattern 530 of third fill shapes 531, which correspond to third features (e.g., diffusion regions). Such a hybrid fill-placeable library element 500 can be placed in the layout of the integrated circuit chip under design in order to meet, at the tile-level or the product-level, not only the first density rule and the second density rule, as discussed above, but also a third density rule directed to these third features when any of the selected functional library elements violate the third density rule. In this case, the first features, the second features and the third features can comprise any three of deep trench features, diffusion regions, polysilicon features, local interconnect features, via interconnect features, and other metal features.

As noted above with regard to the disclosed system and method, that hybrid fill-placeable library element 500 can specifically be compatible in size with gate array base cells in order to allow for selective replacement of such base cells within a gate array. Additionally, the hybrid fill-placeable library element 500 can comprise product-level power and ground through lines 250 to allow for easy integration with other library elements selected for placement in the layout. That is, because of the product-level power and ground through-lines 250 (i.e., power and ground wires that pass through the hybrid fill-placeable library element 500) functional library elements physically separated this hybrid fill-placeable library elements 500 in the layout can be electrically connected to each other.

Finally, this hybrid fill-placeable library element 500 can also comprise a corresponding marker shape 260. This corresponding marker shape 260 can provide an element-specific instruction, which defines one or more custom design rules and, particularly, custom feature density rules. The instruction of this corresponding marker shape 260 can be executable by a processor of a computer-aided design system during design rule checking and, particularly, during design rule compliance verification in order to override any violations, by the hybrid fill-placeable library element 500, of global feature density rules directed to features corresponding to the fill shapes contained therein.

Also disclosed herein is a computer program product. This computer program product can comprise a computer readable storage medium, which stores instructions executable by a computer (e.g., the computer-aided design system or, more particularly, by the processor thereof) to perform any of the above described process steps and/or methods. Accordingly, aspects of these techniques may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed techniques may take the form of a computer program product embodied in one or more computer readable medium(s) having computer readable program code embodied thereon.

Any combination of one or more computer readable medium(s) may be utilized. The computer readable medium may be a computer readable storage device or a computer readable signal medium. A computer readable storage medium is a tangible medium and may be, but is not limited to, any of the following: an electronic, magnetic, optical, electromagnetic, infrared, or semiconductor system, apparatus, or device, or any suitable combination of the foregoing. More specific examples (a non-exhaustive list) of the computer readable storage medium would include, but is not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electromagnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and functional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed method, system and computer program product are described above with reference to flowchart illustrations and/or block diagrams. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 15:
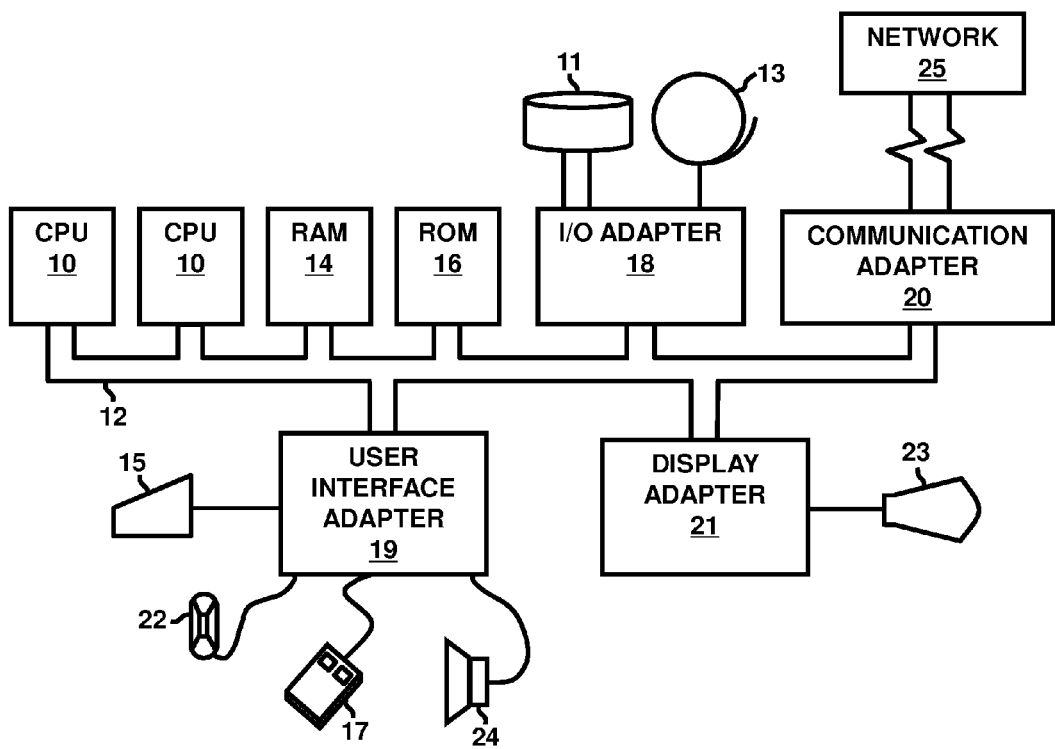
FIG. 15 is representative hardware environment for implementing the disclosed system(s) or components thereof, method(s) and/or computer program product(s).

FIG. 15 is representative hardware environment for implementing the above-disclosed system(s) or components thereof, method(s) and/or computer program product(s). This schematic drawing illustrates a hardware configuration of a computerized device, such as an information handling/computer system. The computerized device comprises at least one processor or central processing unit (CPU) 10. The CPUs 10 are interconnected via bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the computerized device. The computerized device can read the inventive instructions on the program storage devices and follow these instructions to execute the methodology of the disclosed embodiments. The computerized device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowcharts and block diagrams in the Figures referenced above illustrate the architecture, functionality, and operation of the various possible implementations of the above disclosed system, method and computer program product. In this regard, each block in the flowchart or block diagrams may represent a module, segment, or portion of code, which comprises one or more executable instructions for implementing the specified logical function(s). It should also be noted that, in some alternative implementations, the functions noted in any block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that, for purposes of illustration, the disclosed methods and systems have been described with respect to application specific integrated circuit (ASIC) design techniques; however, it is anticipated that these methods and system could be implemented in any other suitable integrated circuit design technique. It should also be noted that the terminology used herein is for the purpose of describing the system, method and computer program product and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including", specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed.

Therefore, disclosed above are integrated circuit (IC) design systems and methods that use a combination of both functional library elements and hybrid fill-placeable library elements. Specifically, during the design process, selected functional library elements can be placed in a layout of an integrated circuit chip in order to meet product specifications and selected hybrid fill-placeable library elements can also be placed at various locations in that layout, as defined using a placement algorithm, in order to meet at least one feature density rule (e.g., a minimum or maximum density rule directed to specific features, such as deep trench features, diffusion regions, polysilicon features, local interconnect features, via interconnect features, or other metal features at a specific mask level). Each hybrid fill-placeable library element can comprise fill shapes corresponding to specific features subject to a density rule and a corresponding marker shape that provides an instruction to ignore any density rule violations within that element for purposes of design rule checking. Placement of the hybrid fill-placeable library elements can be used to balance out density rule violations in functional library elements also in the layout. Optionally, each hybrid fill-placeable library element can comprise different fill shapes at different levels and corresponding to different features so that the same hybrid fill-placeable library element can be employed to meet multiple different density rules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   accessing, by a computer-aided design system, a library stored in a memory, said library comprising functional library elements and hybrid fill-placeable library elements; and
   placing, by said computer-aided design system, both selected functional library elements and at least one selected hybrid fill-placeable library element in a layout of an integrated circuit chip under design,
   said selected hybrid fill-placeable library element being placed in said layout in order to meet, at one of a tile-level and a product-level, a first density rule directed to first features when any of said selected functional library elements violates said first density rule, and
   said selected hybrid fill-placeable library element comprising:
     first fill shapes corresponding to said first features; and
     a corresponding marker shape comprising an instruction that is executable by said computer-aided design system during design rule checking and that defines a custom design rule for said selected hybrid fill-placeable library element.

2. The method of claim 1,
   said selected hybrid fill-placeable library element also being placed in said layout in order to meet, at said one of said tile-level and said product-level, a second density rule directed to second features when said any of said selected functional library elements violates said second density rule, and said selected hybrid fill-placeable library element further comprising second fill shapes corresponding to said second features.

3. The method of claim 2, said first features and said second features comprising any of two of deep trenches, diffusion regions, local interconnect features, polysilicon features, metal features, and via interconnect features.

4. The method of claim 2,
said selected hybrid fill-placeable library element also being placed in said layout in order to meet, at said one of said tile-level and said product-level, a third density rule directed to third features when said any of said selected functional library elements violates said third density rule,
said selected hybrid fill-placeable library element further comprising third fill shapes corresponding to said third features,
said first features, said second features, and said third features comprising any of three of deep trenches, diffusion regions, polysilicon features, local interconnect features, metal features, and via interconnect features.

5. The method of claim 1, said designing comprising:
executing a placement algorithm that defines locations for said selected hybrid fill-placeable library elements within a gate array on said integrated circuit chip in order to meet feature density rules; and
replacing gate array base cells in said gate array at said locations with said selected hybrid fill-placeable library elements, said selected hybrid fill-placeable library elements and said gate array base cells being compatible in size to allow for said replacing.

6. The method of claim 5, said designing comprising executing a placement algorithm that defines locations for said hybrid fill-placeable library elements adjacent to said selected functional library elements in order to meet said feature density rules.

7. The method of claim 1, said hybrid fill-placeable library elements each comprising product-level power and ground through line shapes allowing for integration with said functional library elements.

8. A computer-aided design system comprising:
a memory storing a library comprising functional library elements and hybrid fill-placeable library elements; and
at least one processor accessing said library and placing, in a layout of an integrated circuit chip, both selected functional library elements and at least one selected hybrid fill-placeable library element,
said selected hybrid fill-placeable library element being placed in said layout in order to meet, at one of a tile-level and a product-level, a first density rule for first features when any of said selected functional elements violates said first density rule, and
said selected hybrid fill-placeable library element comprising:
first fill shapes corresponding to said first features; and
a corresponding marker shape comprising an instruction that is executable by said processor during design rule checking and that defines a custom design rule for said selected hybrid fill-placeable library element.

9. The system of claim 8,
said selected hybrid fill-placeable library element also being placed in said layout in order to meet, at said one of said tile-level and said product-level, a second density rule directed to second features when said any of said selected functional library elements violates said second density rule, and
said selected hybrid fill-placeable library element further comprising second fill shapes corresponding to said second features.

10. The system of claim 9, said first features and said second features comprising any of two of deep trenches, diffusion regions, polysilicon features, local interconnect features, metal features, and via interconnect features.

11. The system of claim 9,
said selected hybrid fill-placeable library element also being placed in said layout in order to meet, at said one of said tile-level and said product-level, a third density rule directed to third features when said any of said selected functional library elements violates said third density rule,
said selected hybrid fill-placeable library element further comprising third fill shapes corresponding to said third features, and
said first features, said second features, and said third features comprising any of three of deep trenches, diffusion regions, polysilicon features local interconnect features, metal features, and via interconnect features.

12. The system of claim 8, said designing comprising:
executing a placement algorithm that defines locations for said selected hybrid fill-placeable library elements within a gate array on said integrated circuit chip in order to meet feature density rules; and
replacing gate array base cells in said gate array at said locations with said selected hybrid fill-placeable library elements, said selected hybrid fill-placeable library elements and said gate array base cells being compatible in size to allow for said replacing.

13. The system of claim 8, said designing comprising executing a placement algorithm that defines locations for said hybrid fill-placeable library elements adjacent to said selected functional library elements in order to meet feature density rules.

14. The system of claim 8, said hybrid fill-placeable library elements each comprising product-level power and ground through line shapes allowing for integration with said functional library elements.

15. A hybrid fill-placeable library element in a library stored on a computer-readable storage medium and accessible by a computer-aided design system during integrated circuit design,
said hybrid fill-placeable library element being selectable, by said computer, for placement in a layout of an integrated circuit chip under design in order to meet, at one of a tile-level and a product-level, a first density rule directed to first features when any functional library elements placed in said layout violate said first density rule, and
said hybrid fill-placeable library element comprising:
first fill shapes corresponding to said first features; and
a corresponding marker shape comprising an instruction that is executable by said computer-aided design system during design rule checking and that defines a custom design rule for said hybrid fill-placeable library element.

16. The hybrid fill-placeable library element of claim 15,
said hybrid fill-placeable library element further being selectable, by said computer, for placement in said layout in order to meet, at said one of said tile-level and said product-level, a second density rule directed to second features when said any functional library elements placed in said layout violate said second density rule, and said hybrid fill-placeable library element further comprising second fill shapes corresponding to said second features.

17. The hybrid fill-placeable library element of claim 16, said first features and said second features comprising any of two of deep trenches, diffusion regions, polysilicon features, local interconnect features, metal features, and via features.

18. The hybrid fill-placeable library element of claim 16,
said hybrid fill-placeable library element further being selectable, by said computer, for placement in said layout in order to meet, at said one of said tile-level and said product-level, a third density rule directed to third features when said any functional library elements placed in said layout violate said third density rule, and
said hybrid fill-placeable library element further comprising third fill shapes corresponding to said third features.

19. The hybrid fill-placeable library element of claim 18, said first features, said second features, and said third features comprising any of three of deep trenches, diffusion regions, polysilicon features, local interconnect features, metal features, and via features.

20. The said hybrid fill-placeable library element of claim 15, further comprising product-level power and ground through line shapes allowing for integration with said functional library elements.

* * * * *